US008186862B2

(12) United States Patent
Boroczki et al.

(10) Patent No.: US 8,186,862 B2
(45) Date of Patent: May 29, 2012

(54) INTEGRATED LOW WATTAGE AUTOMOTIVE DISCHARGE LAMP

(75) Inventors: Agoston Boroczki, Budapest (HU); Csaba Horvath, Budapest (HU); Tamas Panyik, Budapest (HU)

(73) Assignee: General Electric Company, Schenectady, NY (US)

( * ) Notice: Subject to any disclaimer, the term of this patent is extended or adjusted under 35 U.S.C. 154(b) by 230 days.

(21) Appl. No.: 12/555,001

(22) Filed: Sep. 8, 2009

(65) Prior Publication Data

US 2011/0058384 A1 Mar. 10, 2011

(51) Int. Cl.
*B60Q 1/00* (2006.01)
*F21S 8/00* (2006.01)

(52) U.S. Cl. ........ 362/538; 362/509; 362/263; 362/549; 362/265

(58) Field of Classification Search .......... 362/263–265, 362/640, 549, 538, 374
See application file for complete search history.

(56) References Cited

U.S. PATENT DOCUMENTS

| | | | | |
|---|---|---|---|---|
| 5,124,895 | A * | 6/1992 | Segoshi et al. | 362/265 |
| 6,364,515 | B1 | 4/2002 | Daub et al. | |
| 6,550,935 | B1 * | 4/2003 | Ueno et al. | 362/263 |
| 8,070,338 | B2 * | 12/2011 | Boroczki et al. | 362/512 |
| 2006/0152940 | A1 | 7/2006 | Josquin et al. | |
| 2006/0245198 | A1 | 11/2006 | Chen et al. | |

FOREIGN PATENT DOCUMENTS

| | | |
|---|---|---|
| DE | 202009003604 U1 | 6/2009 |
| FR | 2916911 A1 | 12/2008 |

OTHER PUBLICATIONS

WO Search Report issued in connection with corresponding WO Patent Application No. US010/45114 filed on Aug. 11, 2010.

* cited by examiner

*Primary Examiner* — Stephen F Husar
*Assistant Examiner* — James Cranson, Jr.
(74) *Attorney, Agent, or Firm* — Fay Sharpe LLP

(57) ABSTRACT

A first exemplary embodiment of an automotive discharge lamp assembly includes an integrated high intensity discharge lamp and driver assembly having a high voltage starter/igniter and a ballast unit contained in a common housing with a high intensity discharge lamp burner extending therefrom. A separate automotive headlamp optical assembly is mechanically and electrically joined to the integrated high intensity discharge lamp and driver assembly. The joining assembly includes snap-fit clamps received on one of (i) the headlamp assembly and (ii) the integrated lamp and driver assembly, and received in a recess/groove on the other of (i) the headlamp optical assembly and (ii) the integrated lamp and driver assembly. Another exemplary embodiment includes at least one bayonet pin extending outwardly from one of (i) the integrated lamp and driver assembly and (ii) the headlamp optical assembly for operative receipt in a recess or groove formed in the other component.

15 Claims, 27 Drawing Sheets

INTEGRATED LOW WATTAGE AUTOMOTIVE DISCHARGE LAMP

BACKGROUND OF THE DISCLOSURE

This application relates to an automotive headlamp, and more particularly to a mechanical and/or electrical joining assembly of an integrated automotive discharge lamp to an automotive headlamp module. The disclosure may find application in related environments where a lamp and associated optical module must be accurately aligned and securely coupled to one another.

Discharge lamps are becoming more frequently used in automotive headlamps. For example, two styles of an automotive headlamp, referred to as a D2 and D4 discharge lamp, separately mount the driver electronics, also referred to as a ballast, and the igniter. In still other types of discharge lamps for automotive headlamps, the igniter is mounted to the lamp, i.e., a built-in igniter, and the ballast is a separate item. These are often referred to as D1 and D3 types.

A newer version of a discharge lamp for an automotive headlamp is being developed. In this arrangement, both the driver electronics and the igniter are an integral part of the lamp itself. This is referred to as a D5S. The integration of the driver electronics and the igniter as an integral part of the lamp itself results in an increased lamp mass. The modified lamp geometry of this fully integrated lamp assembly also imposes new challenges for headlamp designers in order to address the following issues. There is the requirement to mechanically align the fully integrated lamp assembly (i.e., lamp, igniter, driver electronics/ballast) with a headlamp optical module. There is a separate requirement that the fully integrated lamp assembly be securely fixed or coupled to the headlamp optical assembly in order to withstand high vibration loads encountered in the automotive operational environment. Still another feature of the need to fix the fully integrated lamp assembly with the headlamp assembly is the requirement to power the fully integrated lamp assembly by proper electrical contacts into the new mechanical fixation arrangement.

SUMMARY OF THE DISCLOSURE

Reliable mechanical and electrical joining solutions are provided for a fully integrated discharge lamp module to an automotive headlamp module.

A first exemplary embodiment of an automotive discharge lamp assembly includes an integrated high intensity discharge lamp and driver assembly having a high voltage starter/igniter and a ballast unit contained in a common housing with a high intensity discharge lamp burner extending therefrom. A separate automotive headlamp optical assembly is mechanically and electrically joined to the integrated high intensity discharge lamp and driver assembly. The joining assembly includes snap-fit clamps received on one of (i) the headlamp assembly and (ii) the integrated lamp and driver assembly, and received in a recess/groove on the other of (i) the headlamp optical assembly and (ii) the integrated lamp and driver assembly.

Plural snap-fit clamps are preferably spaced at peripheral locations about one of (i) the headlamp optical assembly and (ii) the integrated lamp and driver assembly.

First, second, and third protrusions extend from one of (i) the integrated lamp and driver assembly and (ii) the headlamp optical assembly for abutting engagement with a reference surface on the other of (i) the integrated lamp and driver assembly and (ii) the headlamp optical assembly.

A rotational alignment feature is provided, such as an exemplary slot and key arrangement, for orienting the headlamp optical assembly to the integrated lamp and driver assembly.

A locking member extends from one of the headlamp optical assembly and the integrated lamp and driver assembly for engagement with the other component.

Depending on a location of an electrical connector, the mechanical joining assembly includes electrical contacts incorporated into the assembly to supply power to the integrated electronics, igniter, and discharge lamp assembly.

Another exemplary embodiment of an automotive discharge lamp assembly includes an integrated high intensity discharge lamp and driver assembly having a high voltage starter/igniter unit and a ballast unit contained in a common housing with a high intensity discharge lamp burner extending therefrom. A separate, headlamp optical assembly is joined to the fully integrated discharge lamp and driver assembly. The joining assembly includes at least one bayonet pin extending outwardly from one of (i) the integrated lamp and driver assembly and (ii) the headlamp optical assembly for operative receipt in a recess or groove formed in the other component.

A biasing member exerts a retention force on the bayonet pin to prevent inadvertent removal from the groove.

Likewise, the second exemplary embodiment includes first, second, and third protrusions on one of the components that abuttingly engage a reference surface on the other of the components.

The groove preferably has a generally L-shape whereby the components are assembled in a first, axial relative movement and then in a second, generally circumferential movement.

Again, depending on a location of an electrical connector, the mechanical joining assembly includes electrical contacts incorporated into the assembly to supply power to the integrated electronics, igniter, and discharge lamp assembly.

An associated method of assembling an automotive discharge lamp assembly includes providing the common housing of the fully integrated starter, ballast, and lamp burner, providing a separate headlamp optical assembly, and joining the two components.

A primary advantage is realized by the precise alignment between the separate components.

Another advantage relates to the ability to fix the components together to withstand high vibration loads.

Still another feature is the incorporation of electrical contacts into the lamp holder fixation unit.

Still other benefits and features of the disclosure will become more apparent from reading and understanding the following detailed description.

DETAILED DESCRIPTION OF THE PREFERRED EMBODIMENTS

Figure 1:
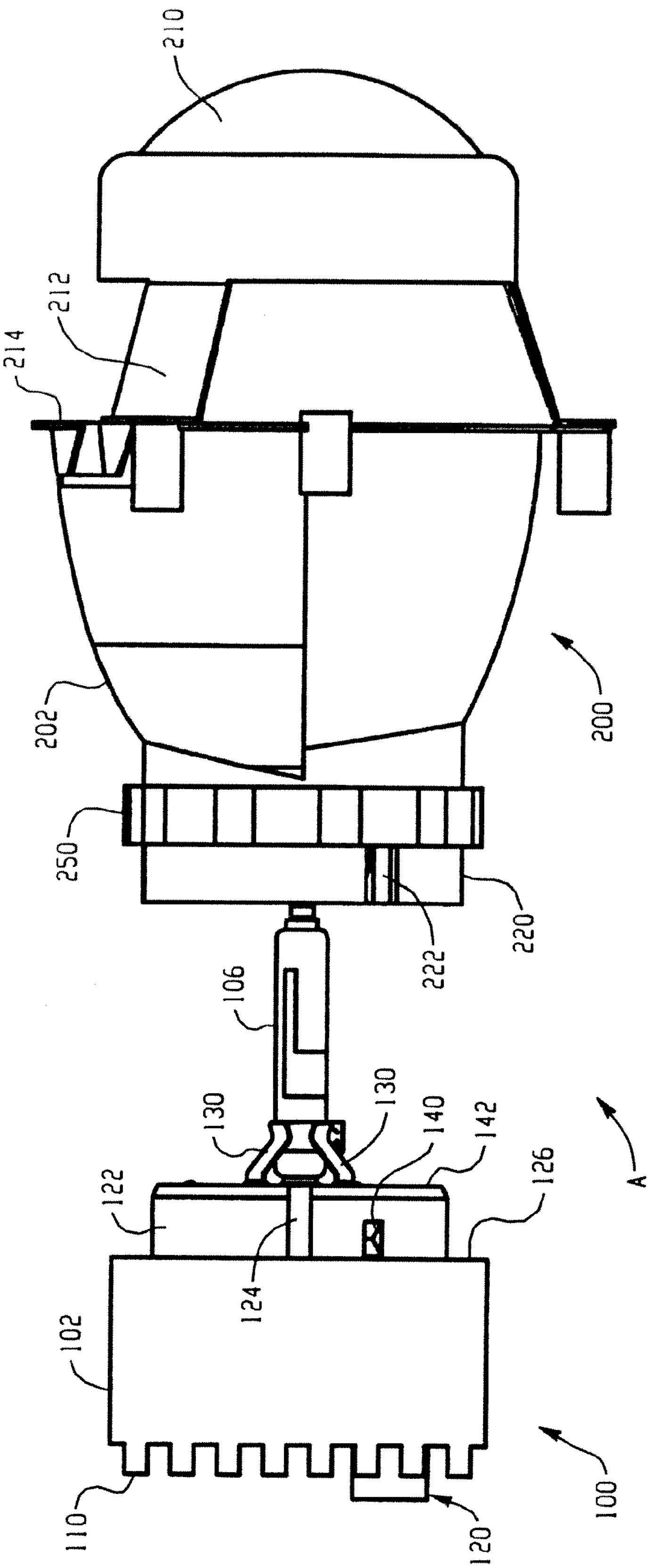
FIG. 1 is an elevational view of a first embodiment of an automotive discharge lamp assembly in disassembled relation.
Figure 2:
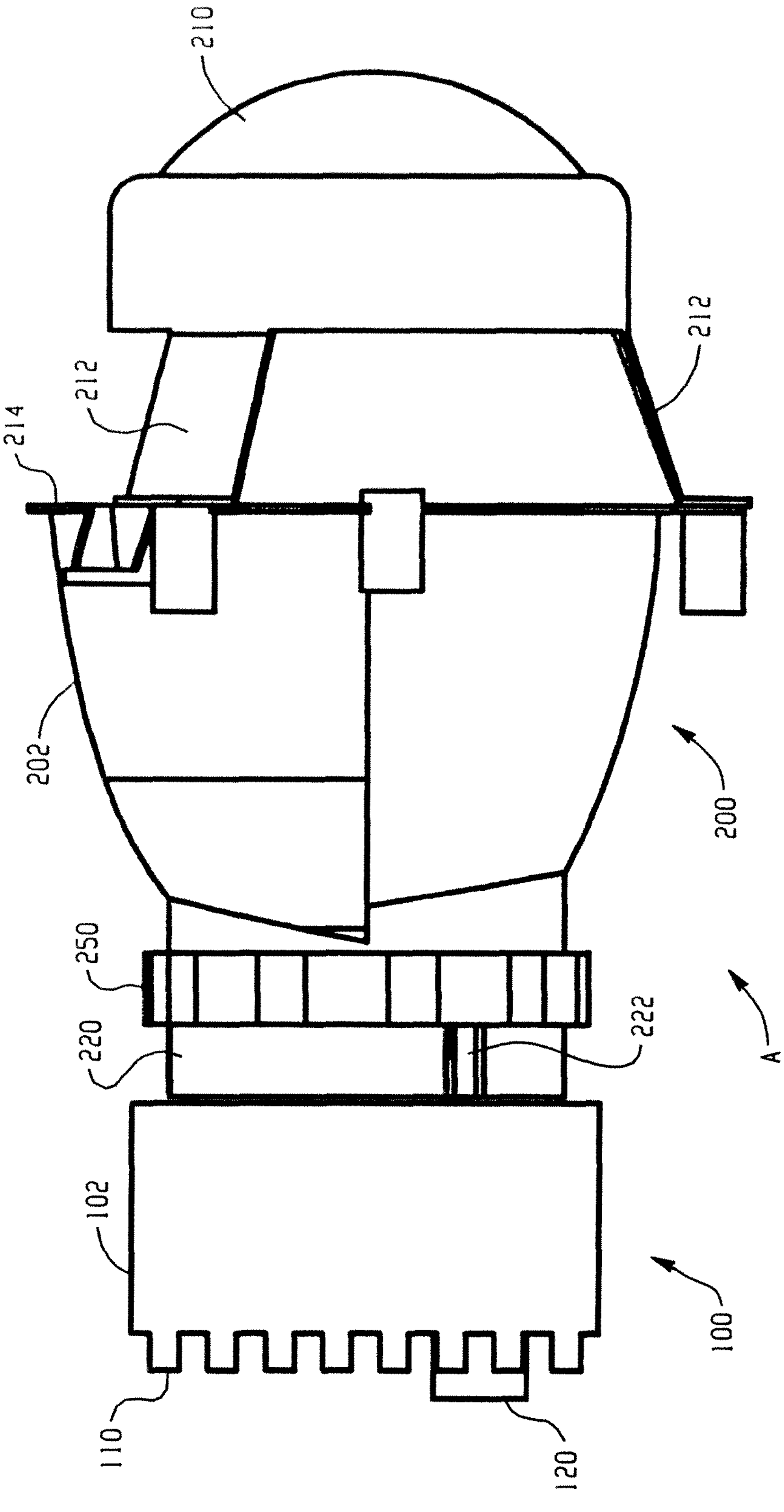
FIG. 2 is an elevational view similar to FIG. 1 in assembled relation.
Figure 3:
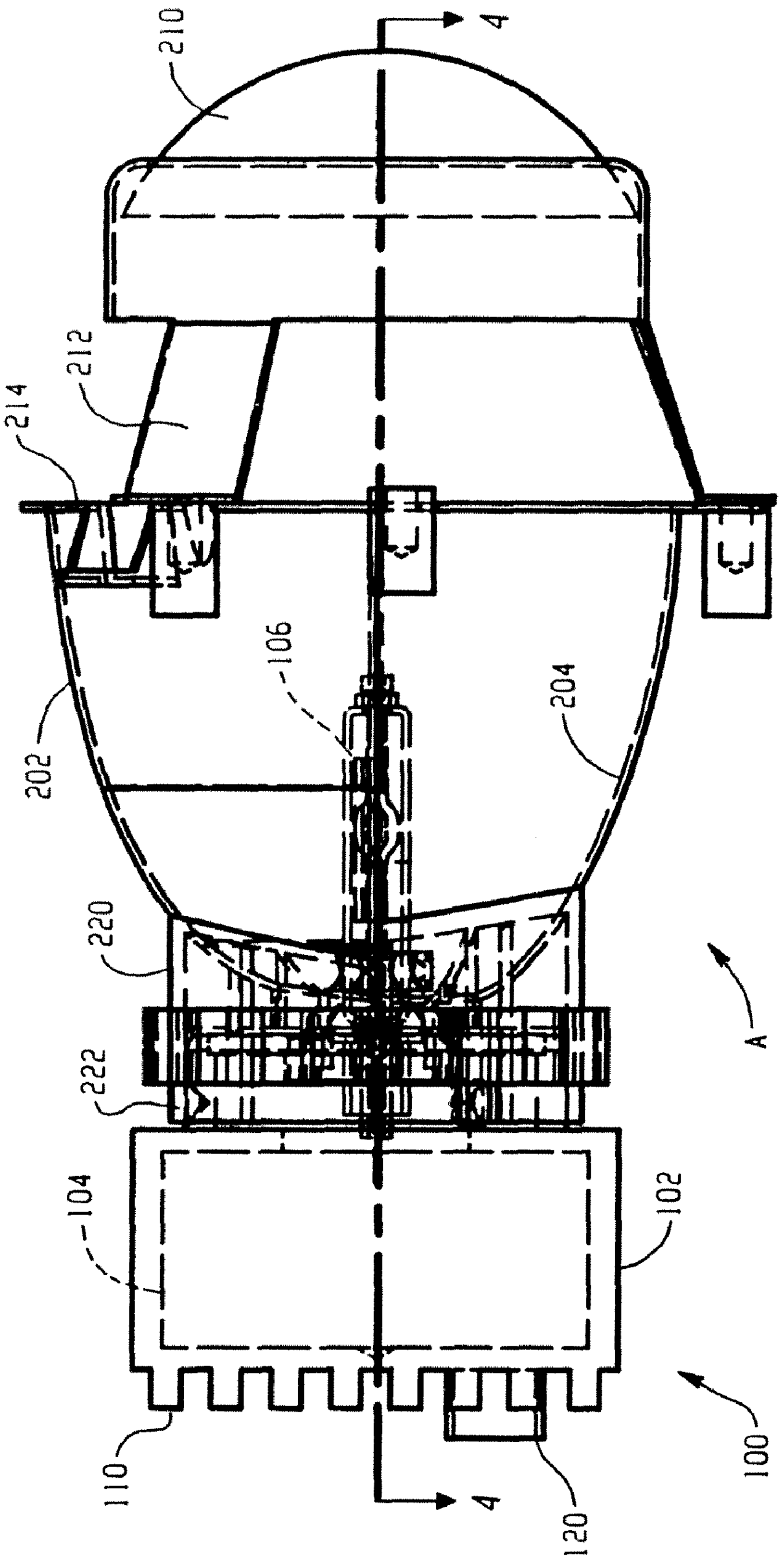
FIG. 3 is an elevational view with selected internal components shown in broken line.
Figure 4:
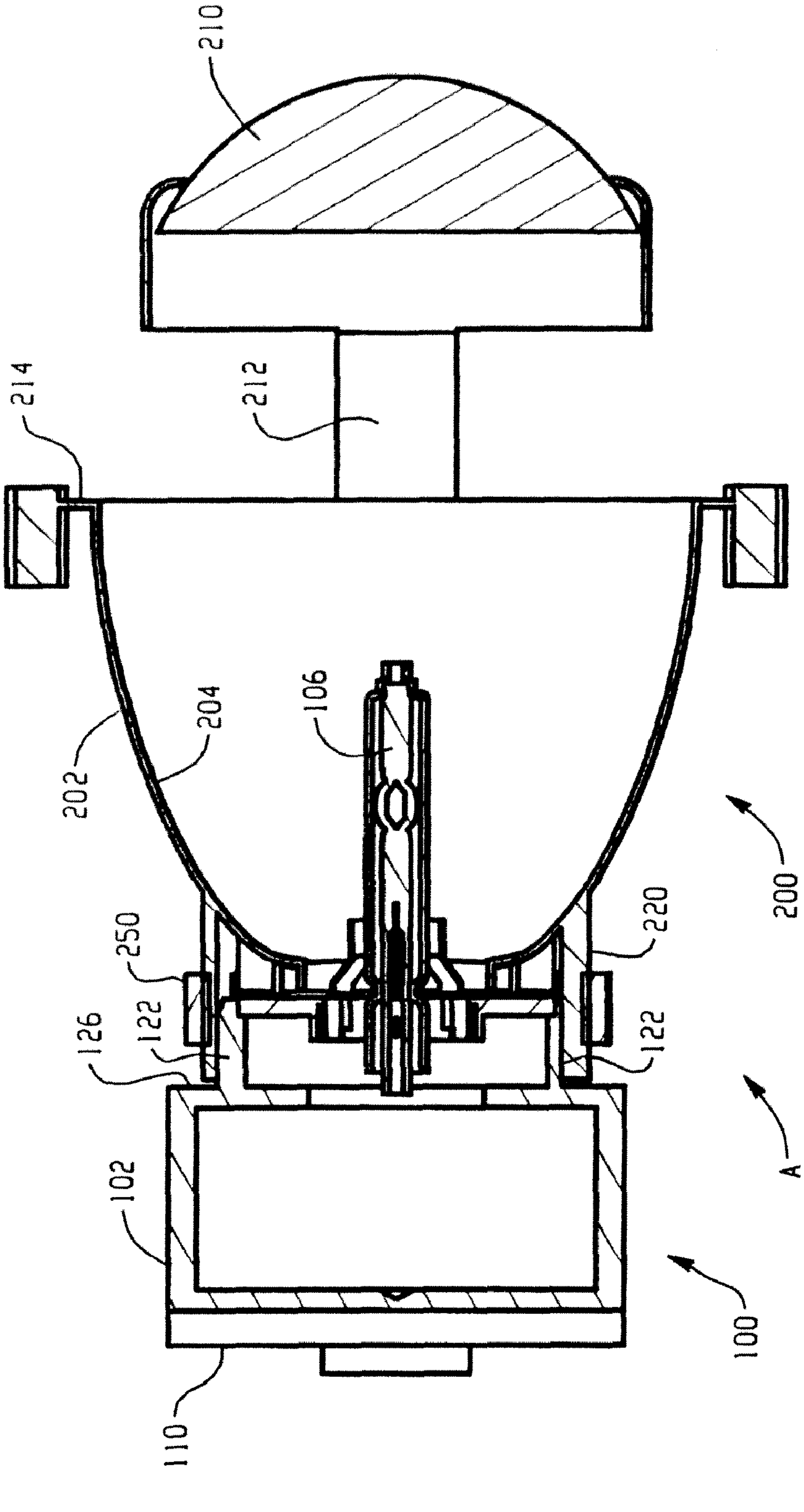
FIG. 4 is a longitudinal cross-sectional view taken generally along the lines 4-4 of FIG. 3.
Figure 5:
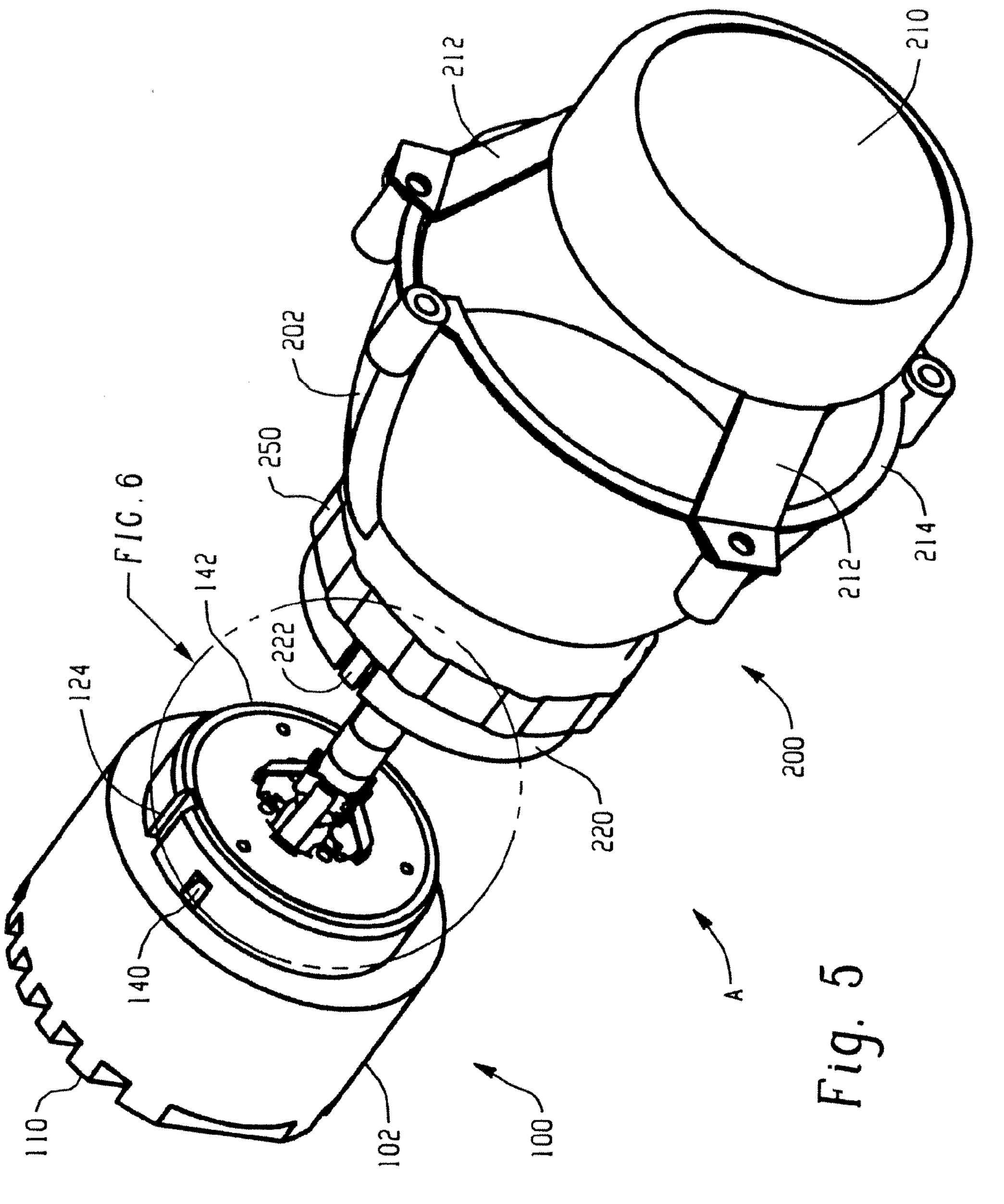
FIG. 5 is a perspective view of the disassembled automotive discharge lamp assembly of FIG. 1.
Figure 6:
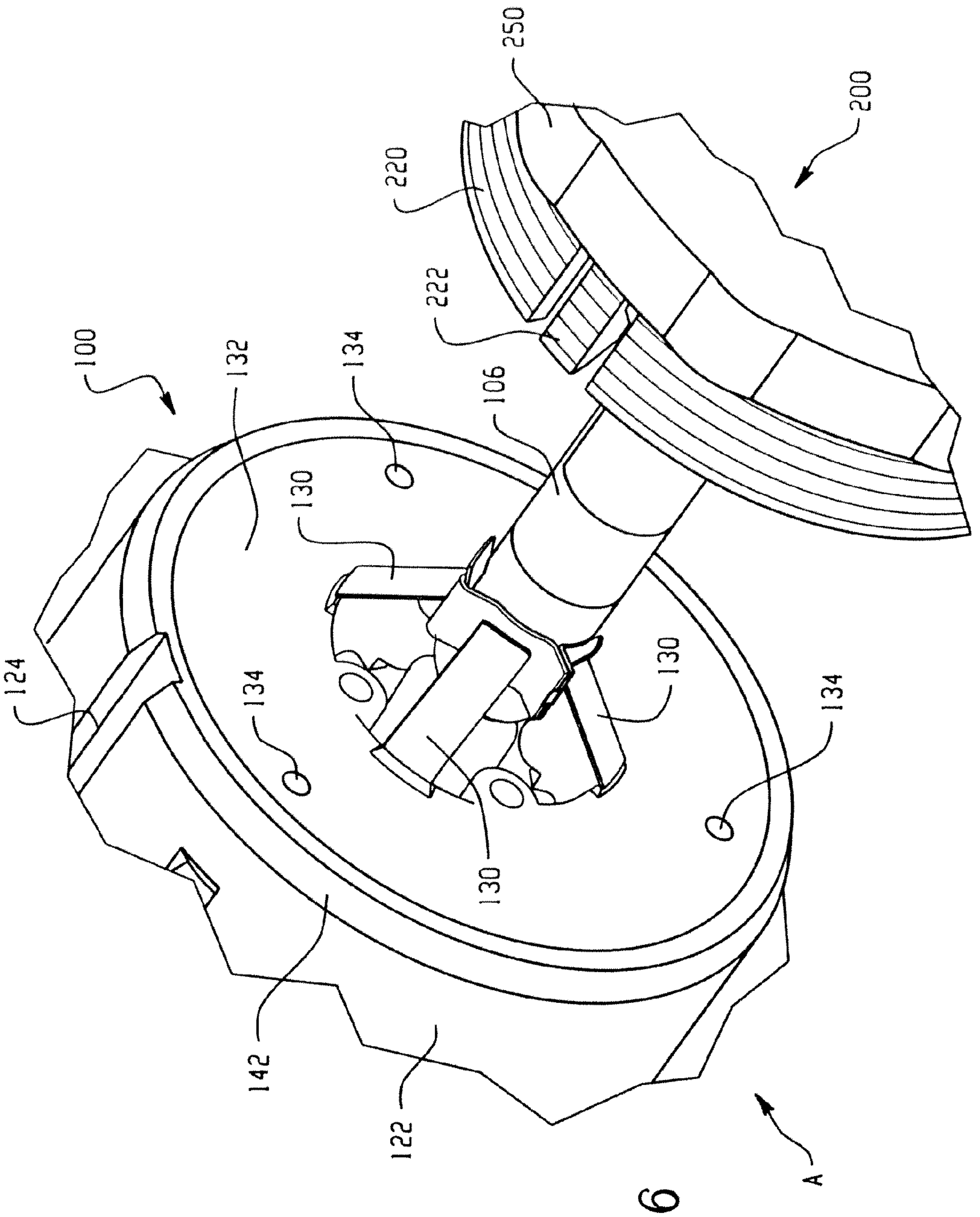
FIG. 6 is an enlarged perspective view of the encircled portion of FIG. 5.
Figure 7:
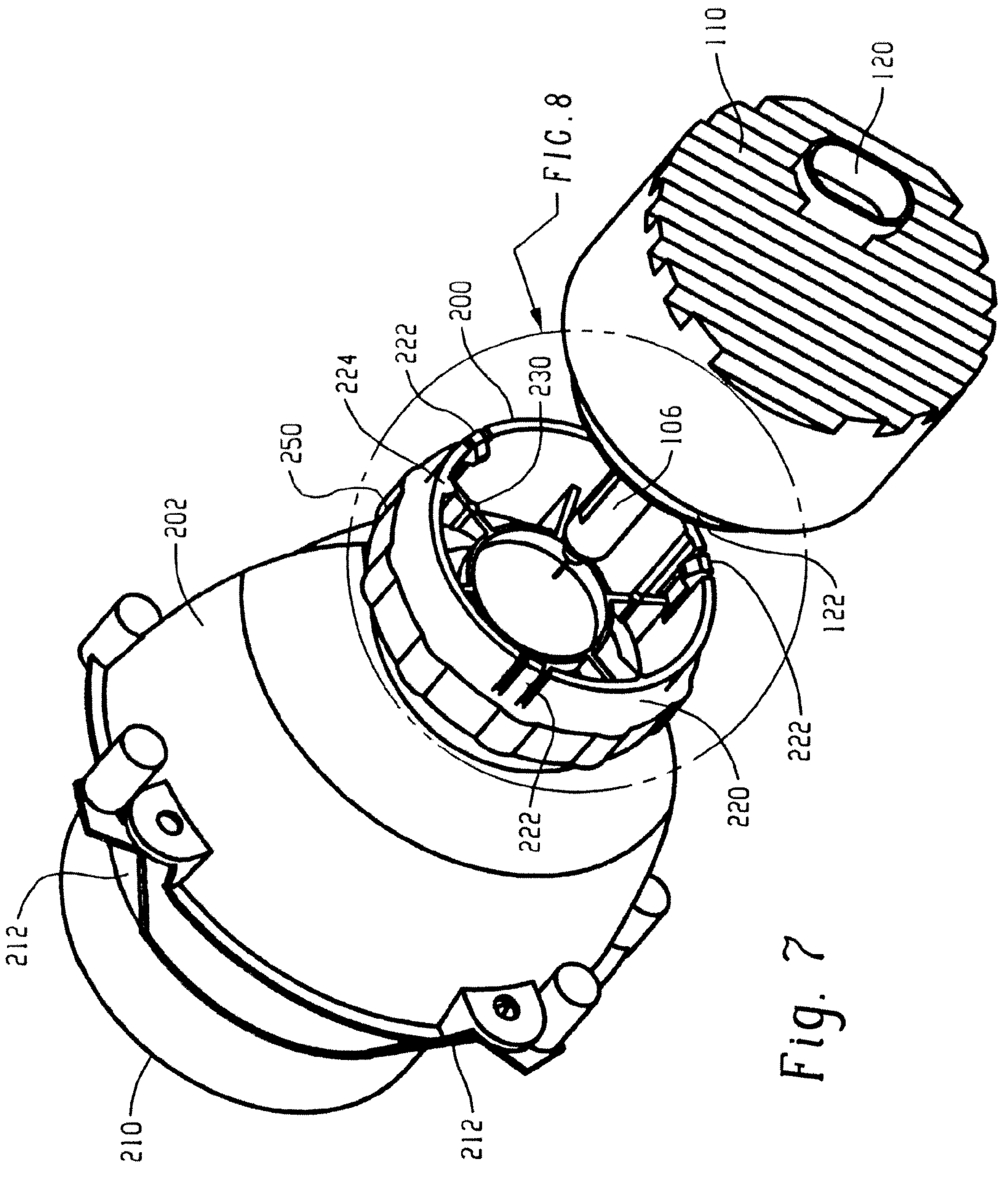
FIG. 7 is a perspective view of the disassembled automotive discharge lamp assembly of FIG. 1.
Figure 8:
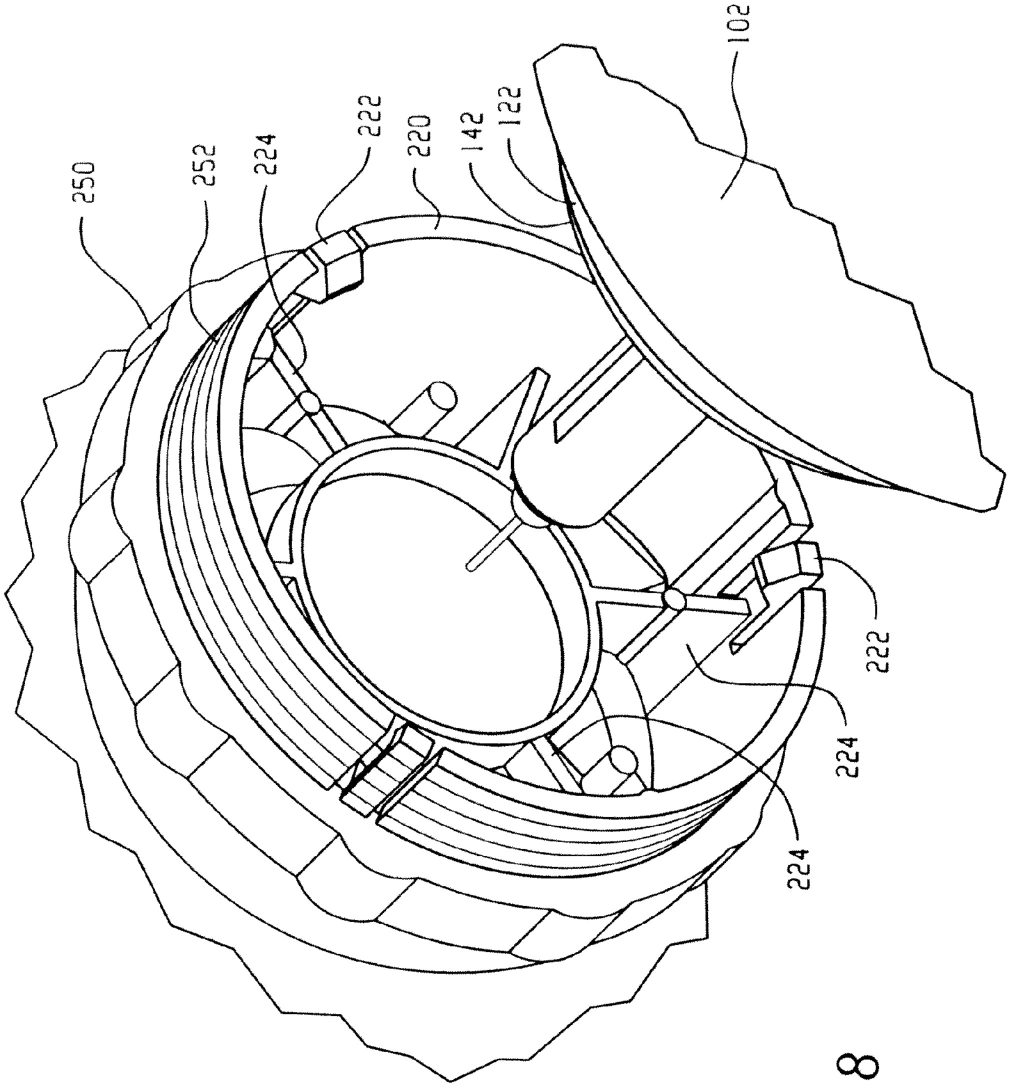
FIG. 8 is an enlarged perspective view of the encircled portion of FIG. 7.
Figure 9:
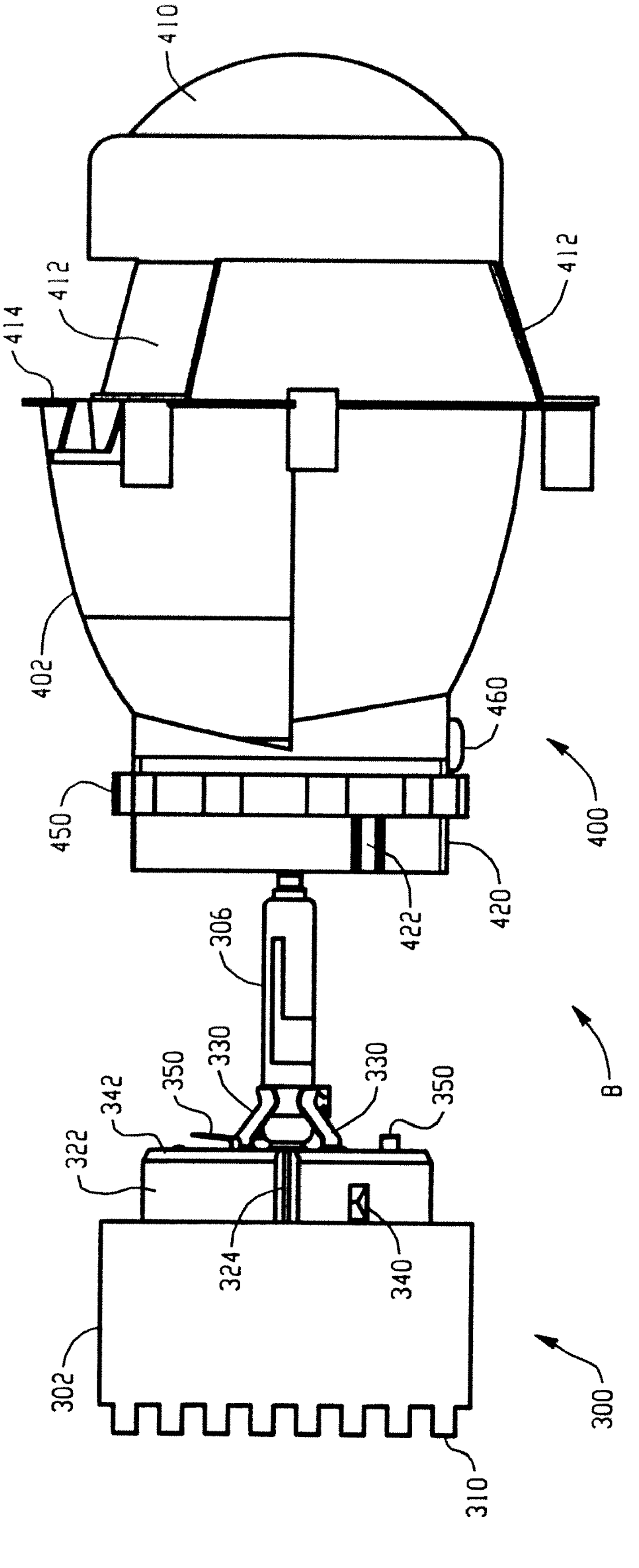
FIG. 9 is a second embodiment of a disassembled automotive discharge lamp assembly.
Figure 10:
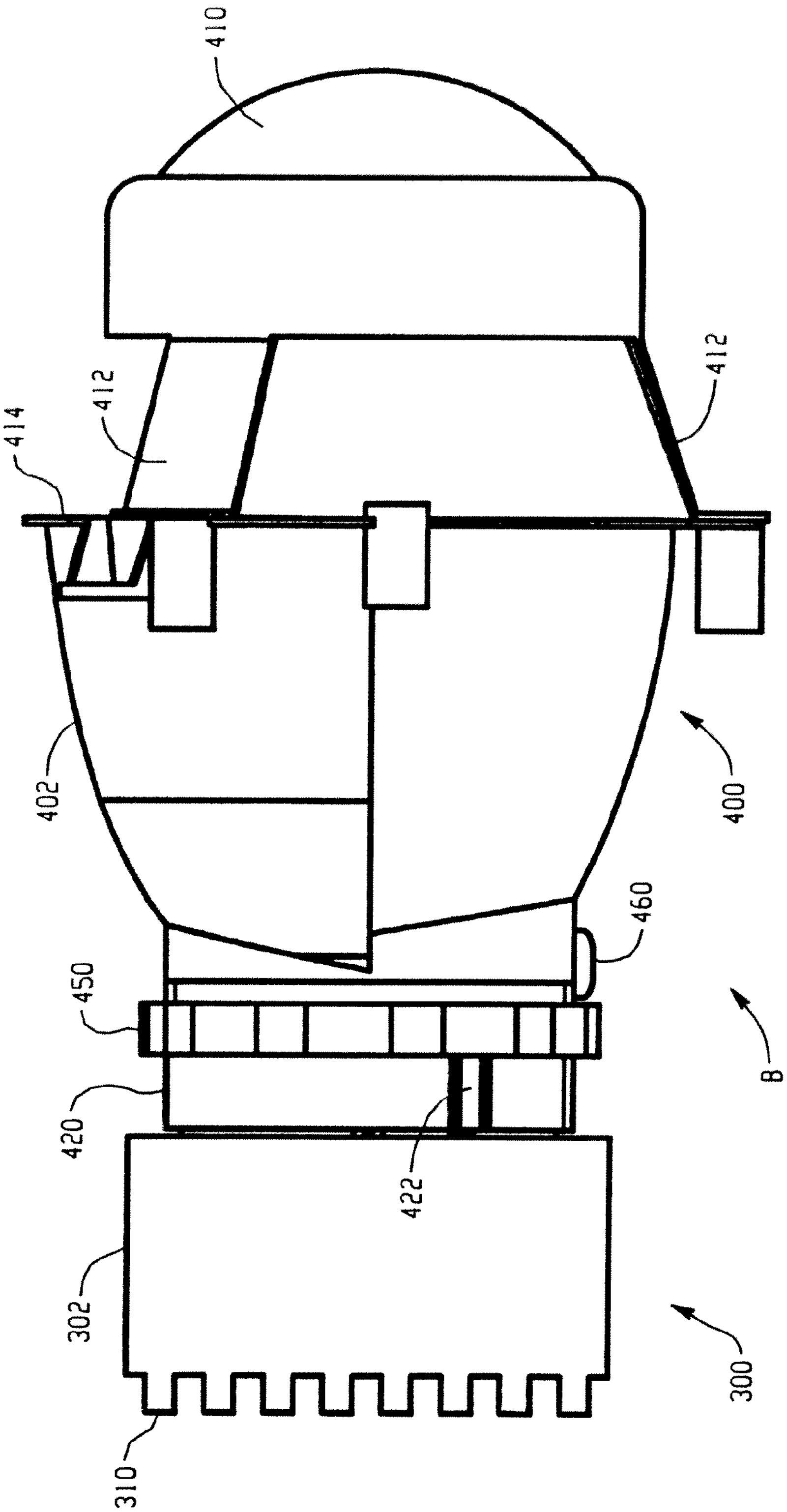
FIG. 10 is an elevational view of the assembled headlamp assembly of FIG. 9.
Figure 11:
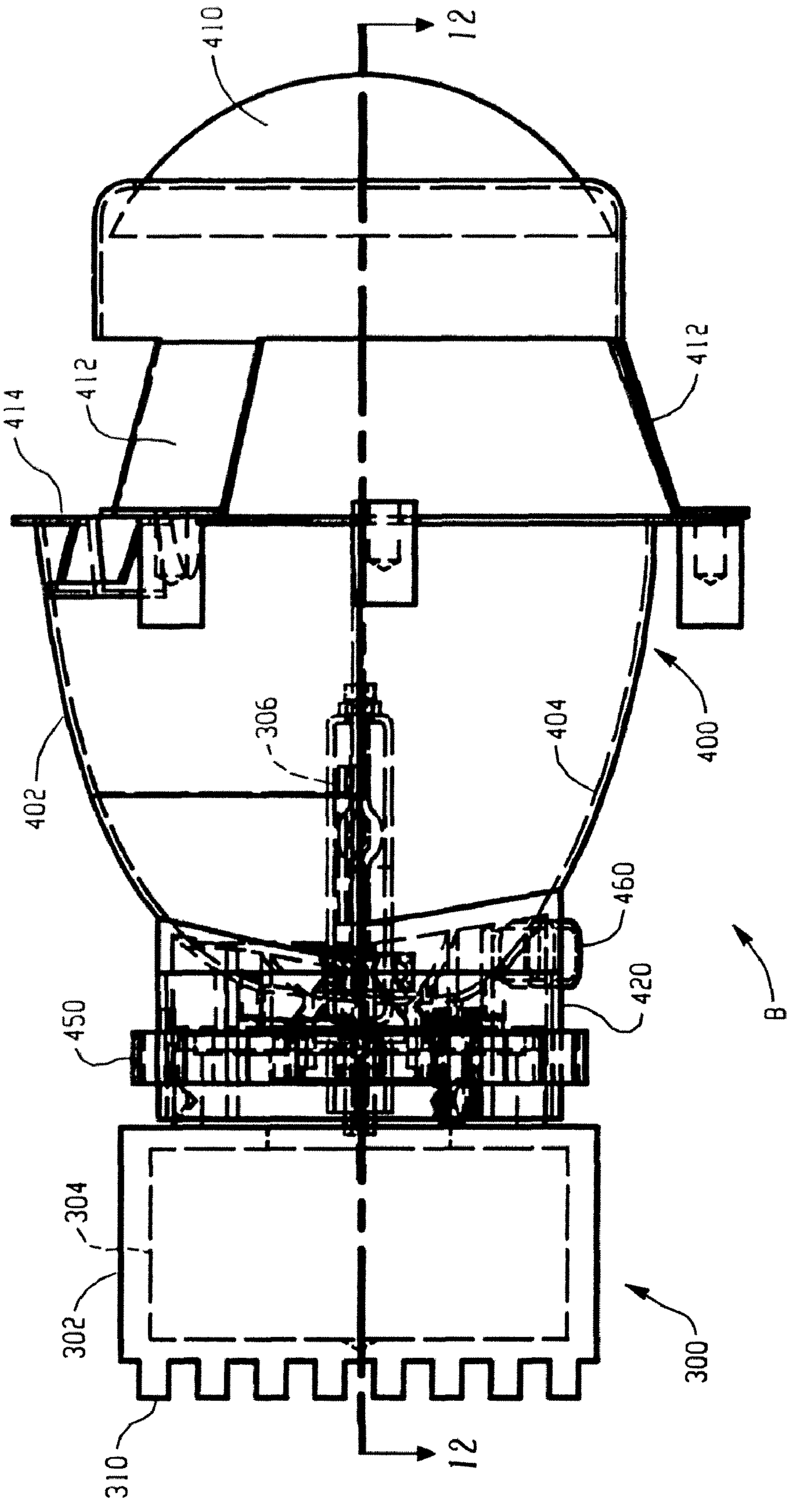
FIG. 11 is an elevational view similar to FIG. 10 with selected internal components shown in broken line.
Figure 12:
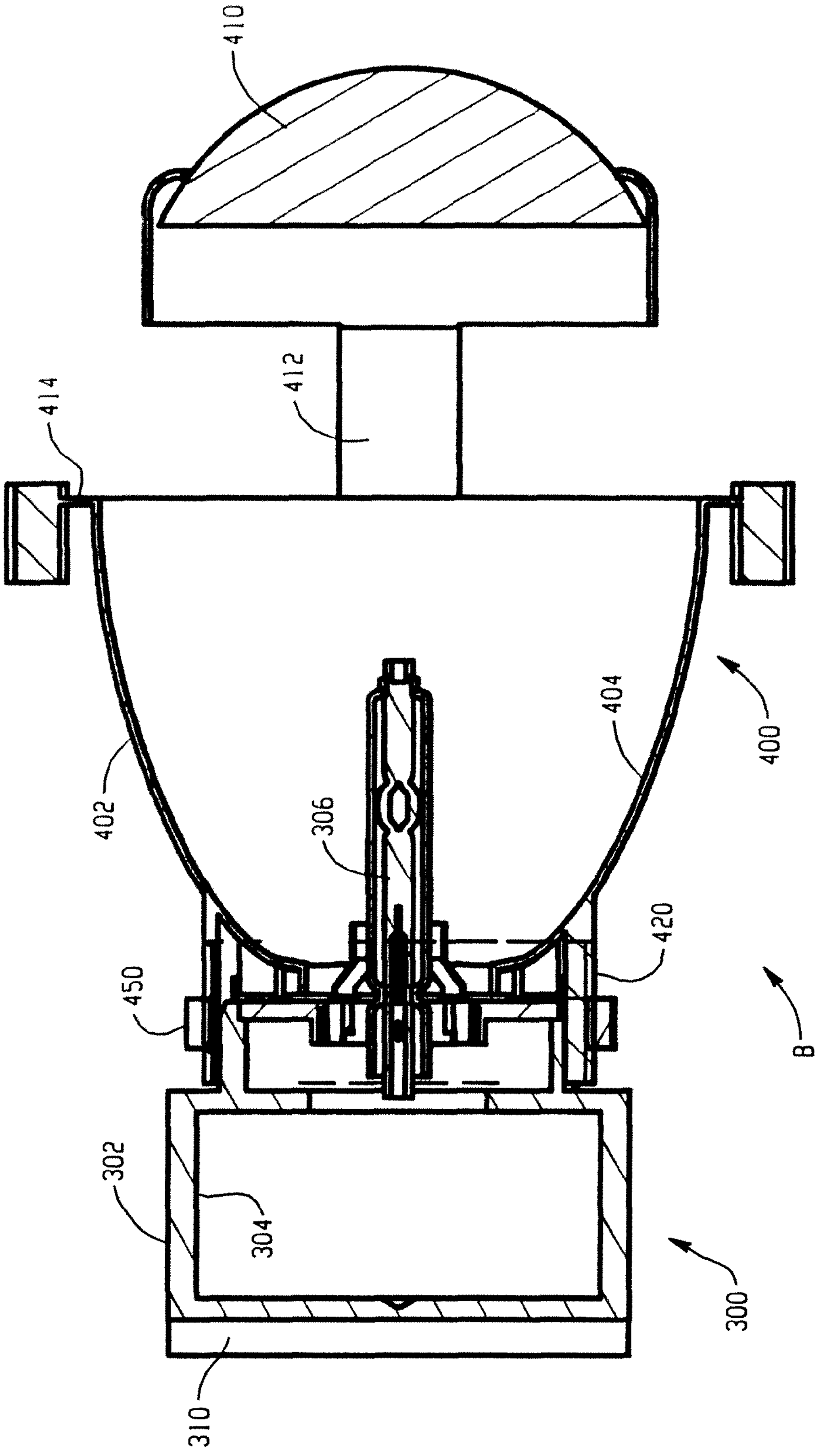
FIG. 12 is a longitudinal cross-sectional view taken generally along the lines 12-12 of FIG. 11.

FIGS. 1-8 illustrate a first embodiment of an automotive discharge lamp assembly A. The lamp assembly in all of the illustrated embodiments generally includes two assemblies or components. The first component 100 is a fully integrated high intensity discharge lamp and driver assembly and the second component 200 is a headlamp optical assembly or module. The first component 100 includes a housing 102 enclosing a high voltage starter or igniter unit 104 (FIG. 3) combined with an electronic driver/ballast unit and a high intensity discharge lamp burner 106 that extends outwardly from the housing 102. The housing preferably includes a cooling surface such as heat transfer fins 110 on a surface portion thereof. In this embodiment, an electrical connector 120 is provided in a portion of the housing, particularly in this instance extends through the surface 110 of the housing. It will be appreciated, however, that the electrical connector that provides the desired electrical power to the high voltage starter/igniter and the ballast unit for operating the discharge lamp could be located at other regions of the housing.

The arc discharge lamp 106 is a generally conventional structure, and is preferably oriented such that a portion of one end of the discharge envelope is partially received in the housing, particularly in a necked-down region 122. A large portion of the lamp extends outwardly from the housing 110 for receipt within the headlamp optical assembly 200 as described further below. Suitable connections between the discharge lamp and the high voltage starter/igniter unit and the ballast are also well known in the art so that further discussion herein is deemed unnecessary.

Reduced diameter portion 122 preferably includes a keyway or recess 124 that provides for proper circumferential orientation of the fully integrated housing with the automotive headlamp optical assembly 200 and shoulder 126 defined between the reduced diameter portion 122 and the remainder of the housing 102 can act as a stop surface to limit further insertion of the housing into the headlamp optical assembly 200. Preferably, the discharge lamp aligns with the longitudinal axis of the optics. Thus in the illustrated embodiment, the housing 102 has a generally cylindrical conformation, although this need not necessarily be the case. An important aspect provided by the extension of the discharge lamp outwardly from the housing 102 is to orient the lamp for receipt in the optical component. To support and properly align the discharge lamp, clamp arms 130 are provide at circumferentially spaced locations about the lamp envelope and extend outwardly from generally planar surface 132 of the housing. The planar surface 132 preferably includes first, second, and third protrusions 134 extending outwardly in the same direction at spaced locations from the surface. The protrusions 134 extend a predetermined height about the generally planar surface 132. The protrusions are preferably at least three (3) in number in order to define a reference plane of the integrated housing. Since the lamp is fixedly secured by the clamps 130, and thus precisely located relative to the planar surface 132, the protrusions cooperate with the automotive headlamp optical assembly 200 in order to place the arc discharge of the lamp at a predetermined location. As perhaps best illustrated in FIG. 5, the recess 124 in the reduced diameter portion 122 provides at least one alignment feature for circumferential orientation of the integrated housing 102. Individual recesses 140 are provided at perimeter locations to receive an associated snap-fit clamp to be described below. Rather than individual recesses 140, a continuous or semi-continuous groove could also be used for receiving the snap-fit clamps.

The second component or headlamp optical assembly 200 of the automotive headlamp assembly A includes a housing 202. The housing that has an internal reflective surface 204 (FIG. 3) that directs light rays from the lamp in a desired direction, preferably through lens 210 supported in spaced relation by mounting aims 212 from an open end 214 of the housing. Use of the reflective surface 204 and the lens 210 provides for controlled light output from the lamp and directs the light in a predetermined beam pattern for illuminating a roadway.

Due to the increased mass associated with the fully integrated housing 100, it is important to not only align but securely mount the headlamp optical assembly 200 to the integrated housing 100. Adjacent a narrow end of the reflective surface 204, i.e., opposite the open end 214, is a coupling surface 220. An annular conformation of the coupling surface is dimensioned for close receipt over surface 122 of the integrated housing. Snap-fit clamps 222 are provided in the coupling surface at circumferentially spaced locations that align with the recesses 140. Upon relative axial movement of the first and second components 100, 200 of the lamp assembly toward one another from the spaced, disassembled position of FIG. 1 to a fully made-up position shown in FIG. 2. The snap-fit clamps 222 ride over tapered shoulder 142, along the surface 122, and snap-fit or mechanically engage with an individual recess 140. Thus, by simple axial advancement (once the two components have been rotationally oriented by aligning one or more internal ribs 224 with an associated recess 124), complete make-up and securing of the two components is achieved. This accurately aligns the discharge lamp axis with the optical axis of the reflective surface 204, and also positions the discharge region of the lamp at the desired axial position within the reflective surface. In this manner, light output from the lamp is efficiently directed by the reflective surface through the associated lens 210.

Each of the reference plane protrusions 134 preferably aligns with an associated surface on the headlamp optical assembly. In the illustrated preferred arrangement, each of the protrusions 134 is aligned and adapted for abutting engagement with an associated surface 230 defined on a radially extending wall or rib 232 that extends outwardly from annular surface 234 within the annular coupling wall 220. Of course, this particular configuration of three individual points which together define a reference plane for the optical assembly could be altered, and a different conformation of a single surface or spaced surface portions provided to define a reference plane abutment between the first and second components 100, 200.

In addition, a locking member 250 (in this embodiment a threaded ring) is provided on the coupling surface 220 and cooperates with thread portions 252 that extend about the circumference of the coupling surface. The locking ring 250 is adapted for rotation relative to the coupling surface. Once the first and second components 100, 200 are axially advanced and coupled together, the locking ring is advanced over the threaded regions, which advantageously positions the locking ring over the individual snap-fit clamps, thereby locking the fully integrated housing 100 to the headlamp optical assembly 200. This further maximizes the secure attachment of the components together, in an aligned manner, so that the joined components 100, 200 are able to withstand vibrations as may be encountered in the automotive headlamp environment.

One skilled in the art will also appreciate that the joining or coupling assembly can be reversed without departing from the scope and intent of the present disclosure. For example, the first component 100 may include the snap-fit clamps while the second component 200 could incorporate the associated recesses or a groove.

Figure 13:
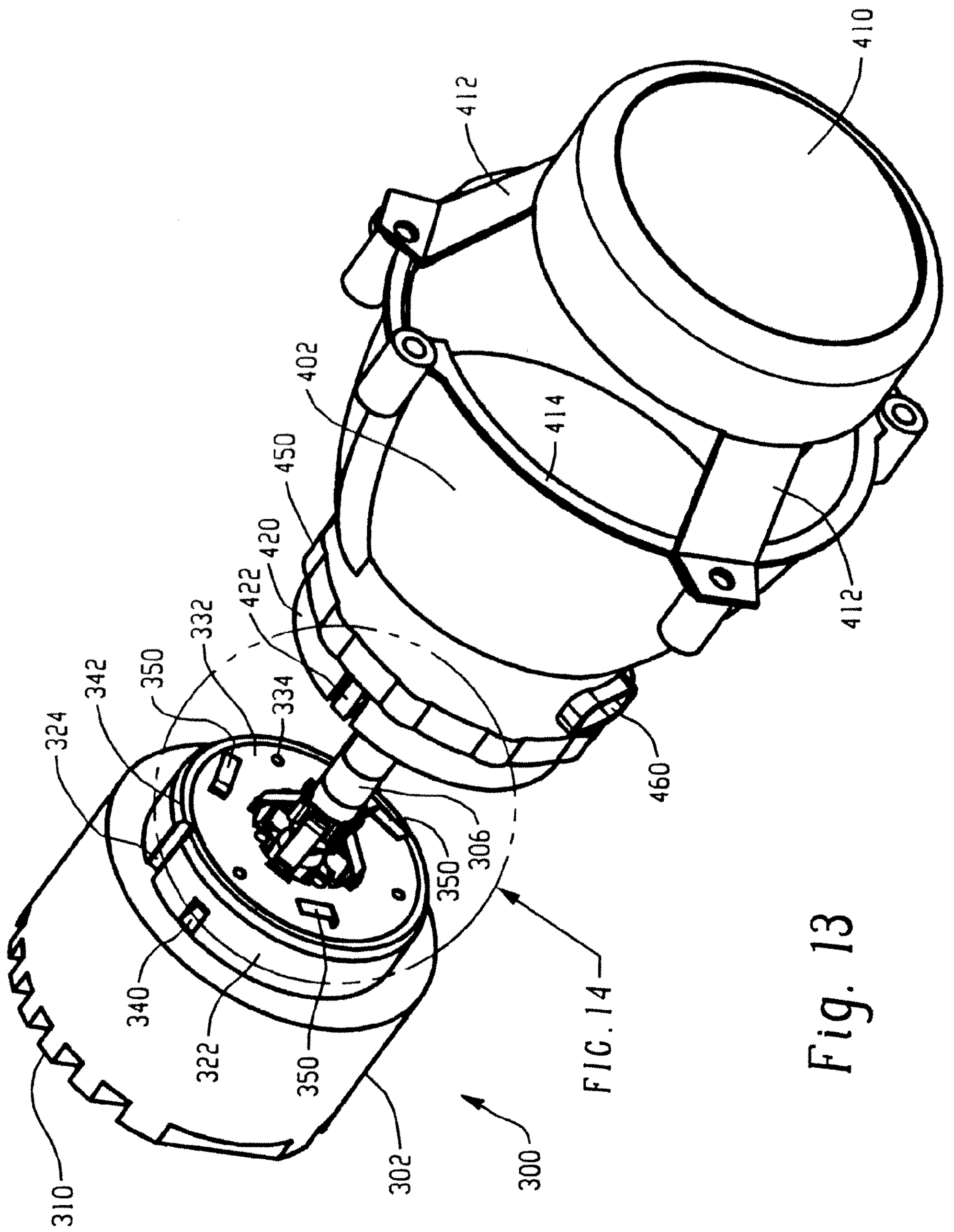
FIG. 13 is a perspective view of the disassembled automotive discharge assembly of FIG. 9.
Figure 14:
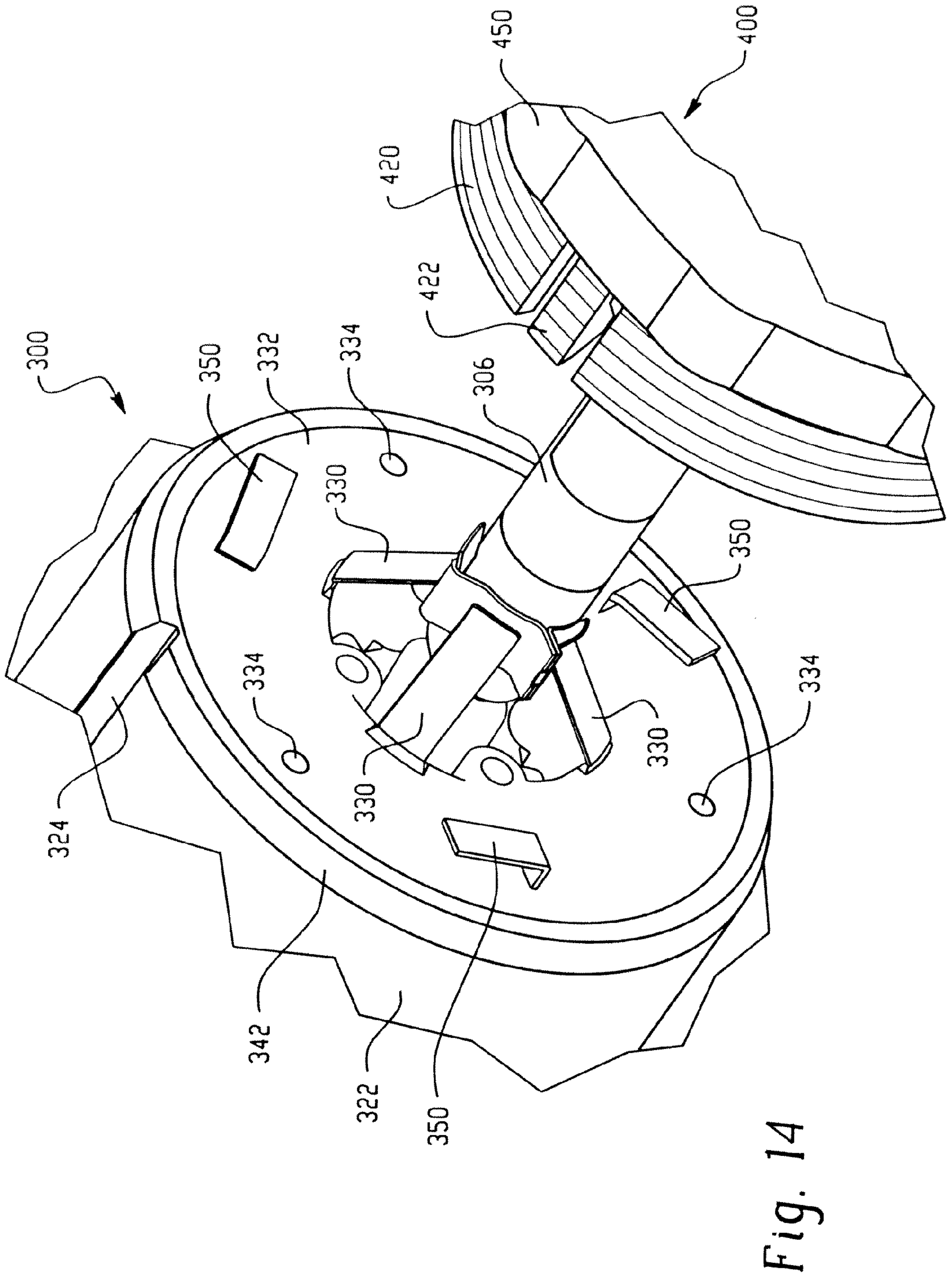
FIG. 14 is an enlarged perspective view of the encircled portion of FIG. 13.
Figure 15:
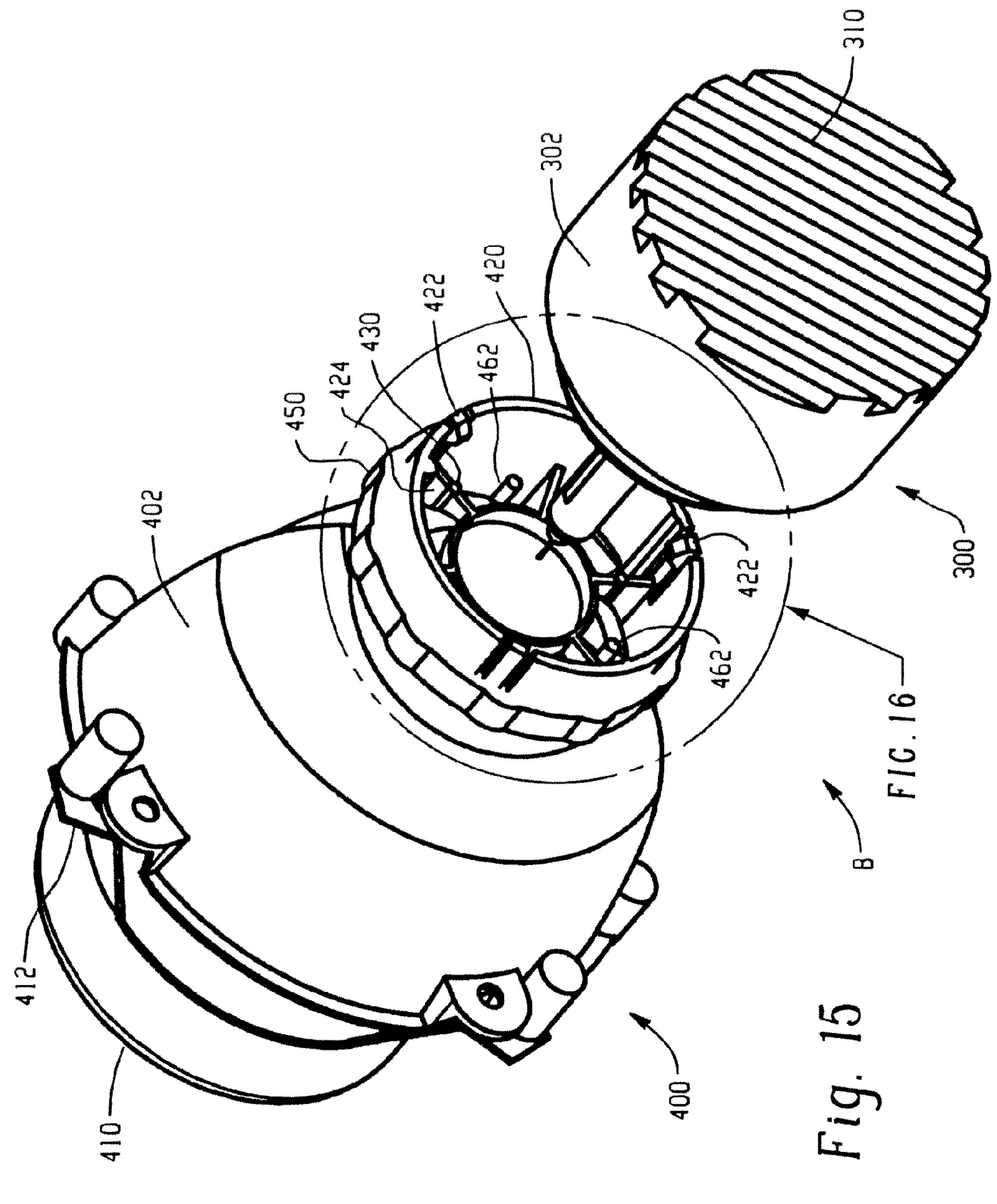
FIG. 15 is a perspective view of the disassembled headlamp assembly of FIG. 9.
Figure 16:
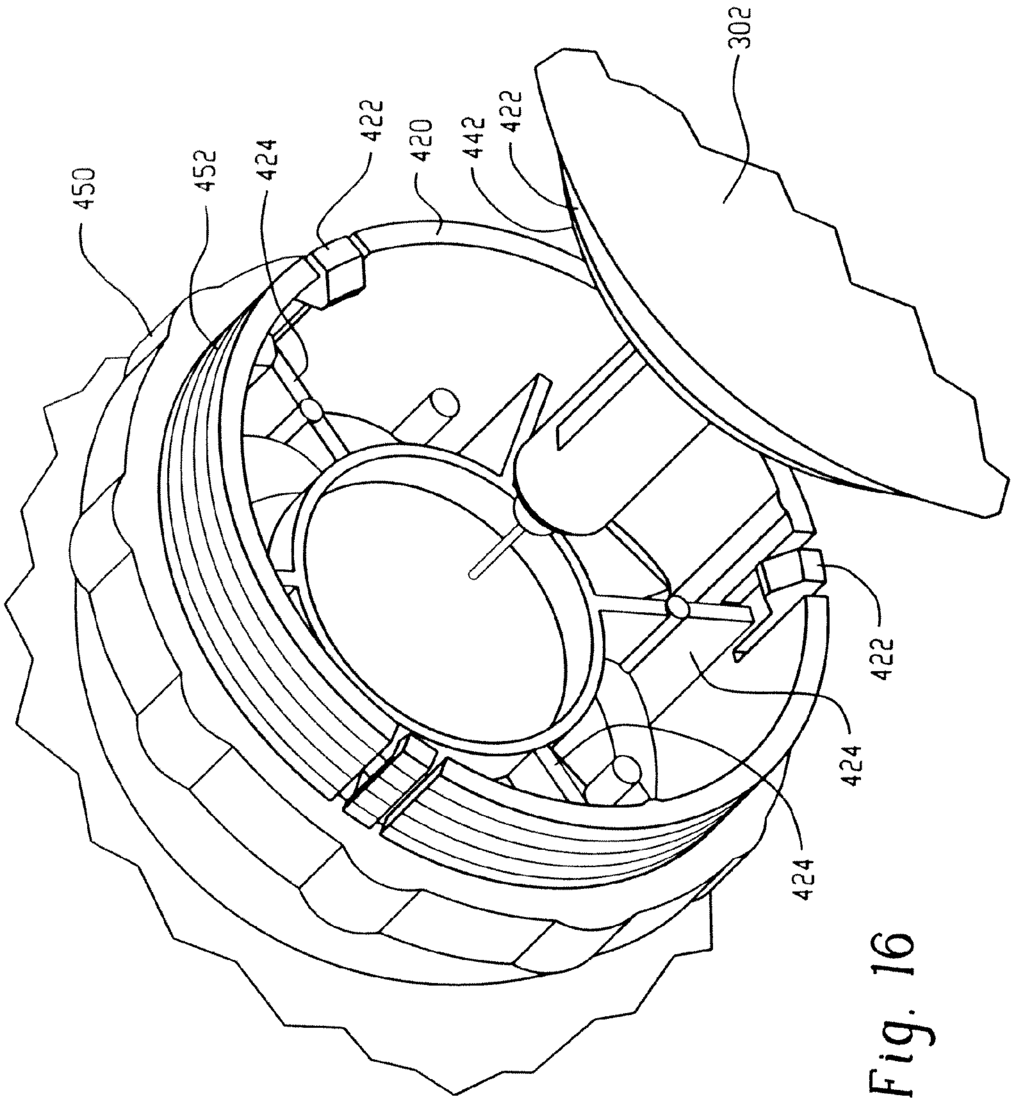
FIG. 16 is an enlarged perspective view of the encircled portion of FIG. 15.
Figure 17:
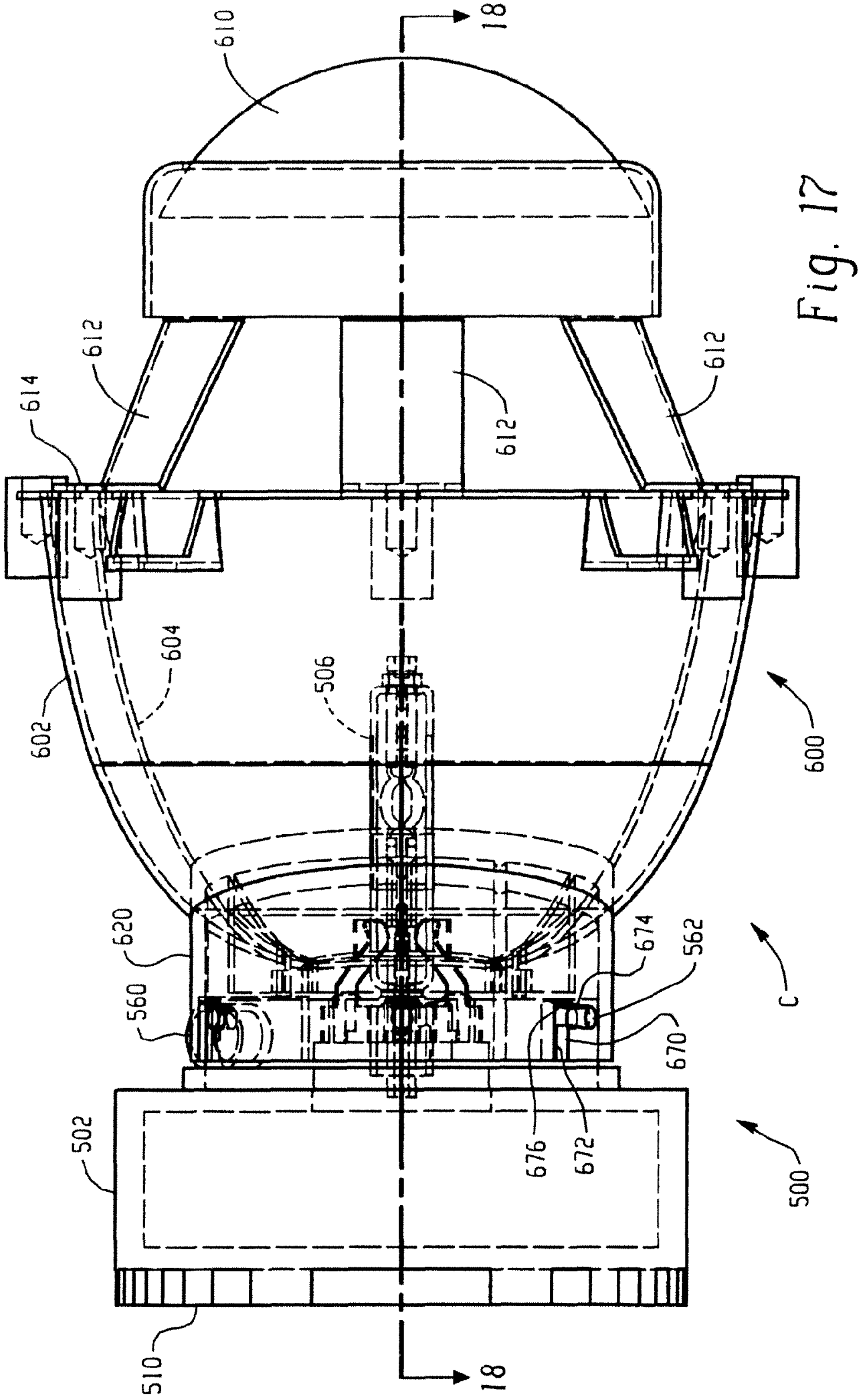
FIG. 17 is an elevational view of a third embodiment of an assembled automotive discharge lamp assembly, with selected internal components shown in broken line.
Figure 18:
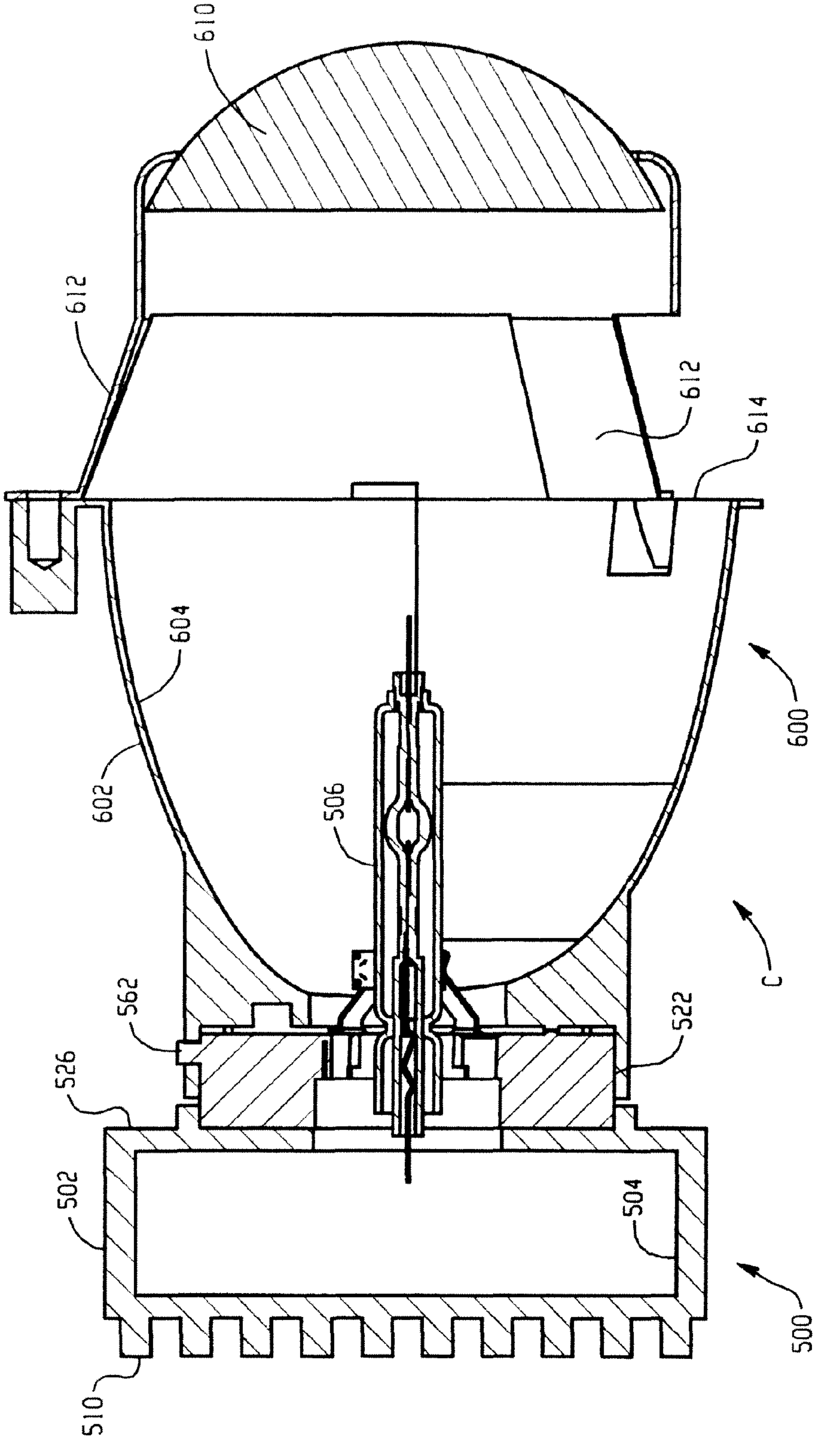
FIG. 18 is a longitudinal cross-sectional view taken generally along the lines 18-18 of FIG. 17.
Figure 19:
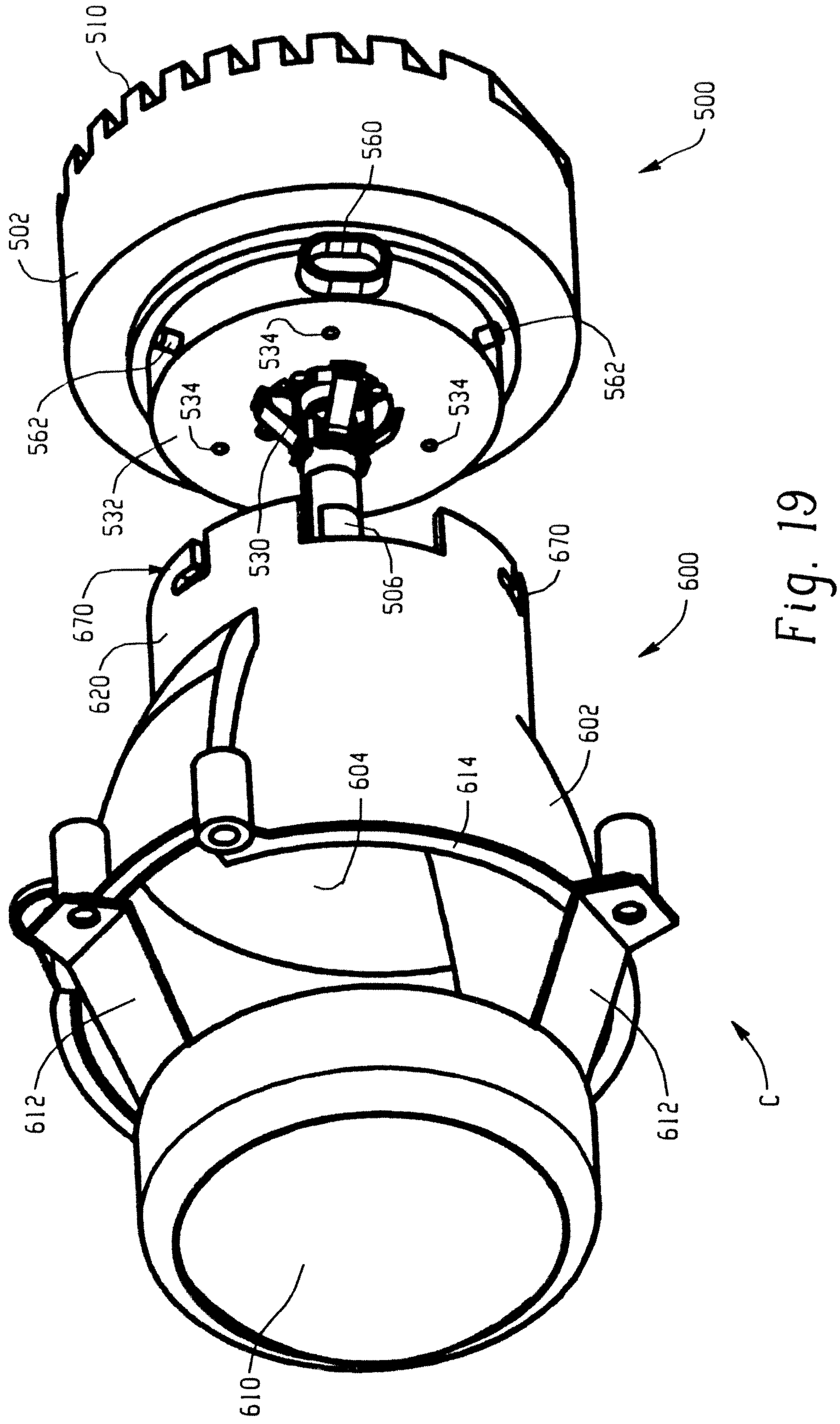
FIG. 19 is a perspective view of the disassembled automotive discharge lamp assembly of FIG. 17.
Figure 20:
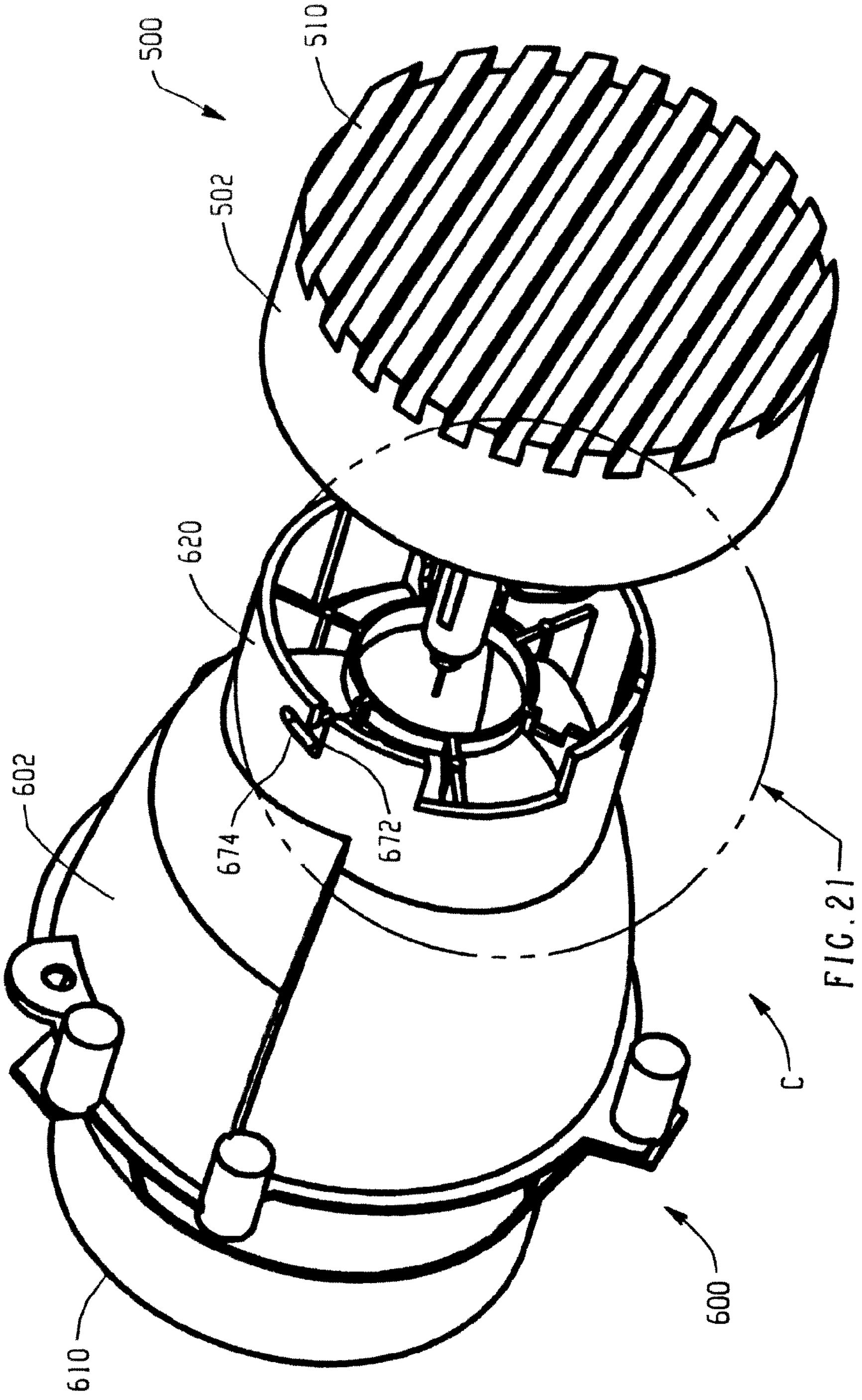
FIG. 20 is another perspective view of the disassembled automotive discharge lamp assembly.
Figure 21:
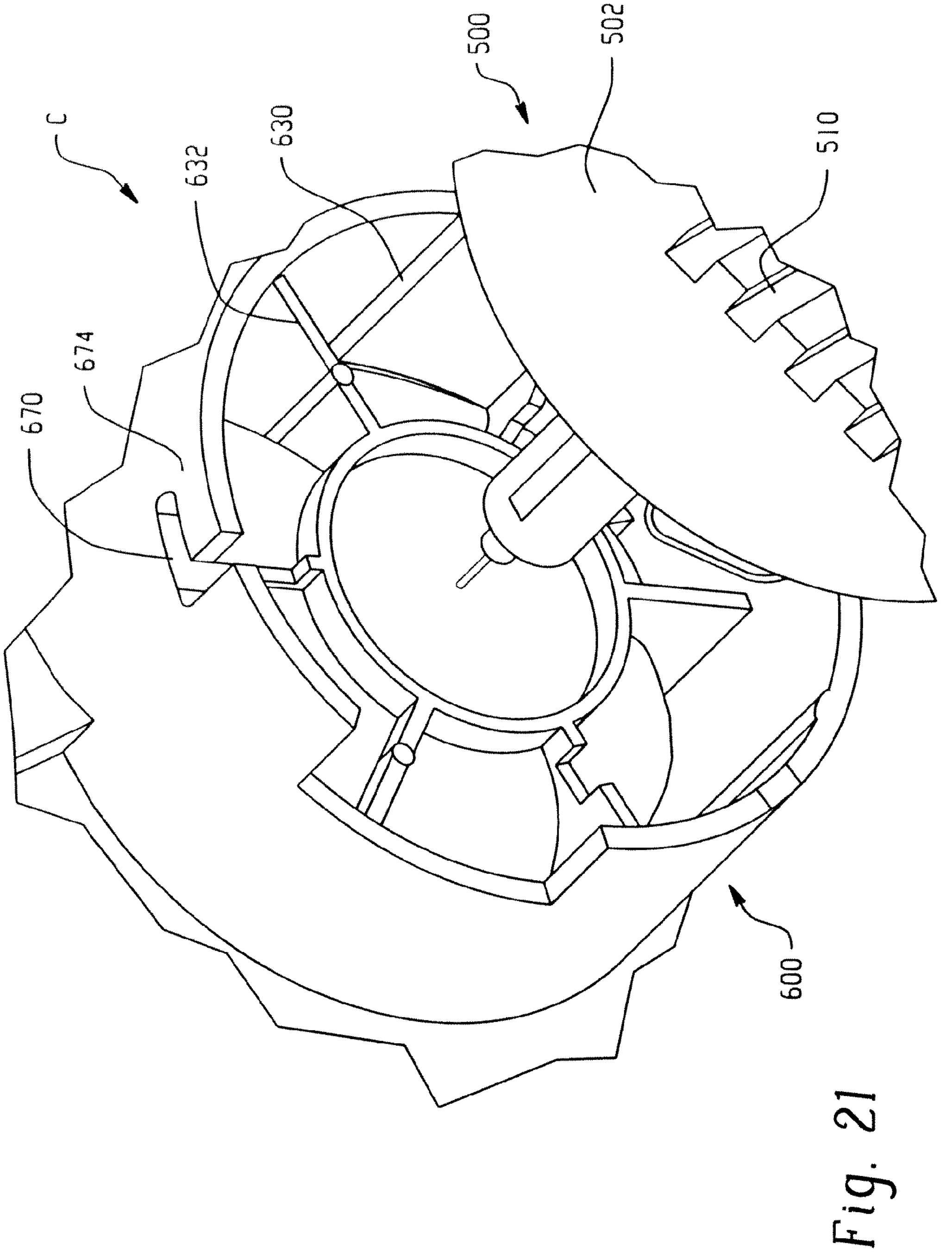
FIG. 21 is an enlarged perspective view of the encircled portion of FIG. 20.
Figure 22:
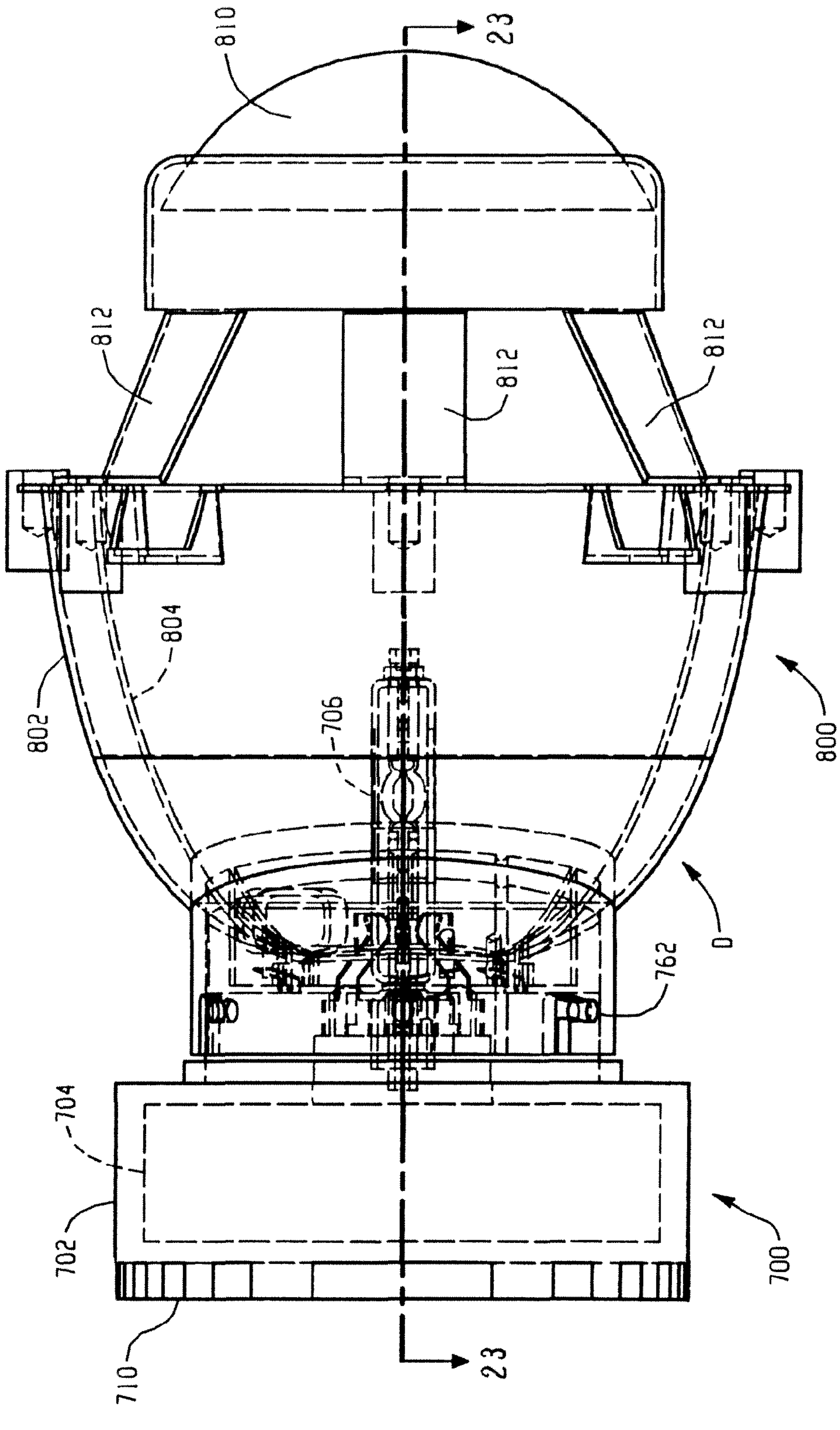
FIG. 22 is an elevational view of a fourth embodiment of an automotive discharge lamp assembly, with selected internal components in broken line.
Figure 23:
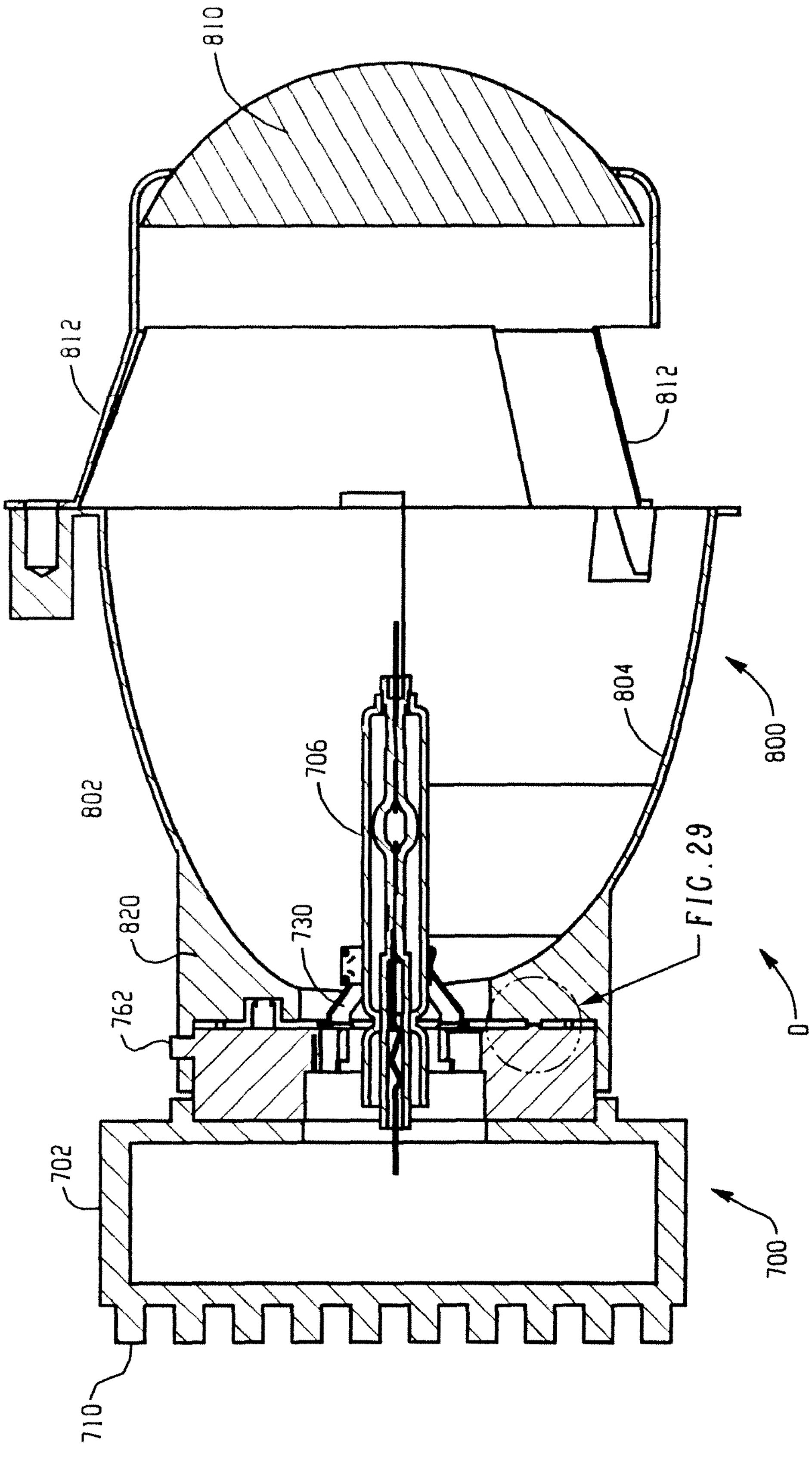
FIG. 23 is a longitudinal cross-sectional view taken generally along the lines 23-23 of FIG. 22.
Figure 24:
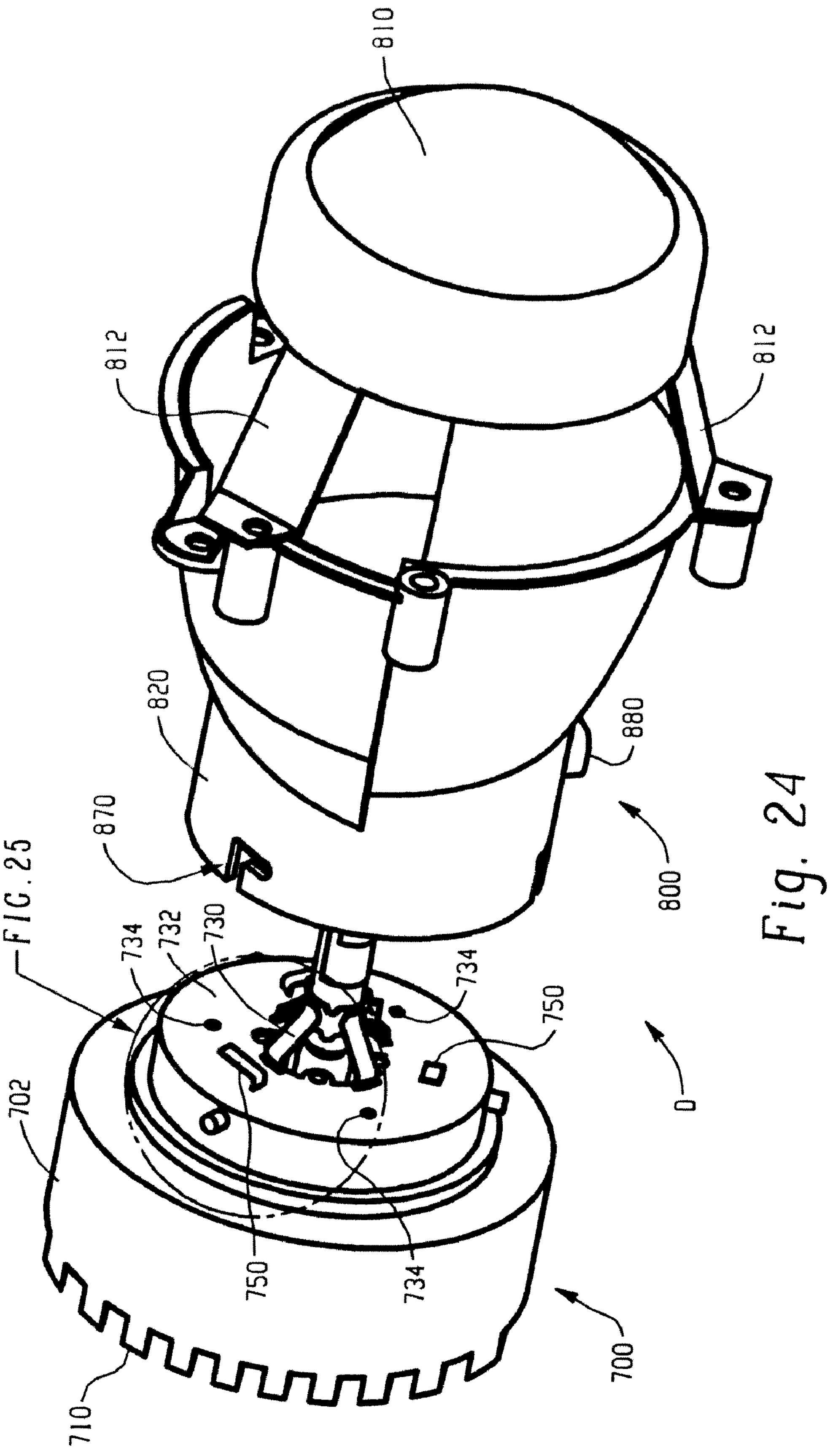
FIG. 24 is a perspective view of the disassembled lamp assembly of FIG. 22.
Figure 29:
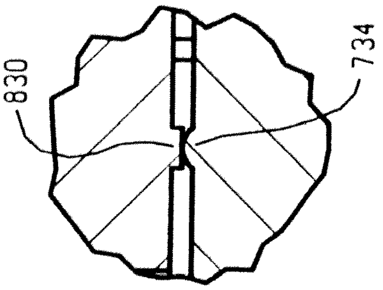
FIG. 29 is an enlarged detail view of the encircled portion of FIG. 23.
Figure 28:
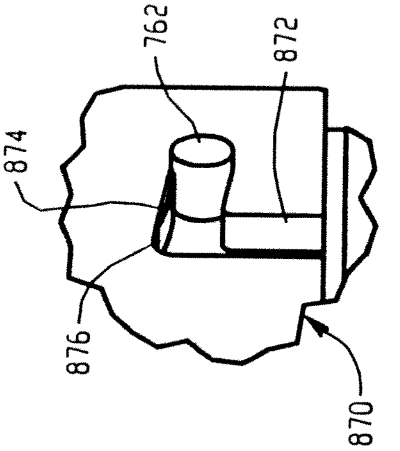
FIG. 28 is an enlarged elevational view of the encircled portion of FIG. 22.
Figure 25:
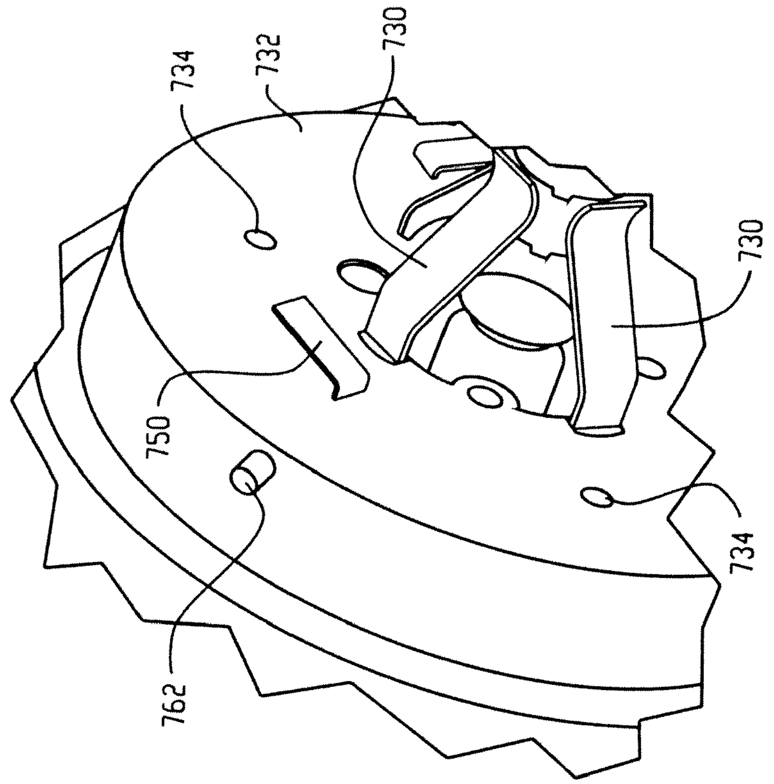
FIG. 25 is an enlarged perspective view of the encircled region of FIG. 24.
Figure 26:
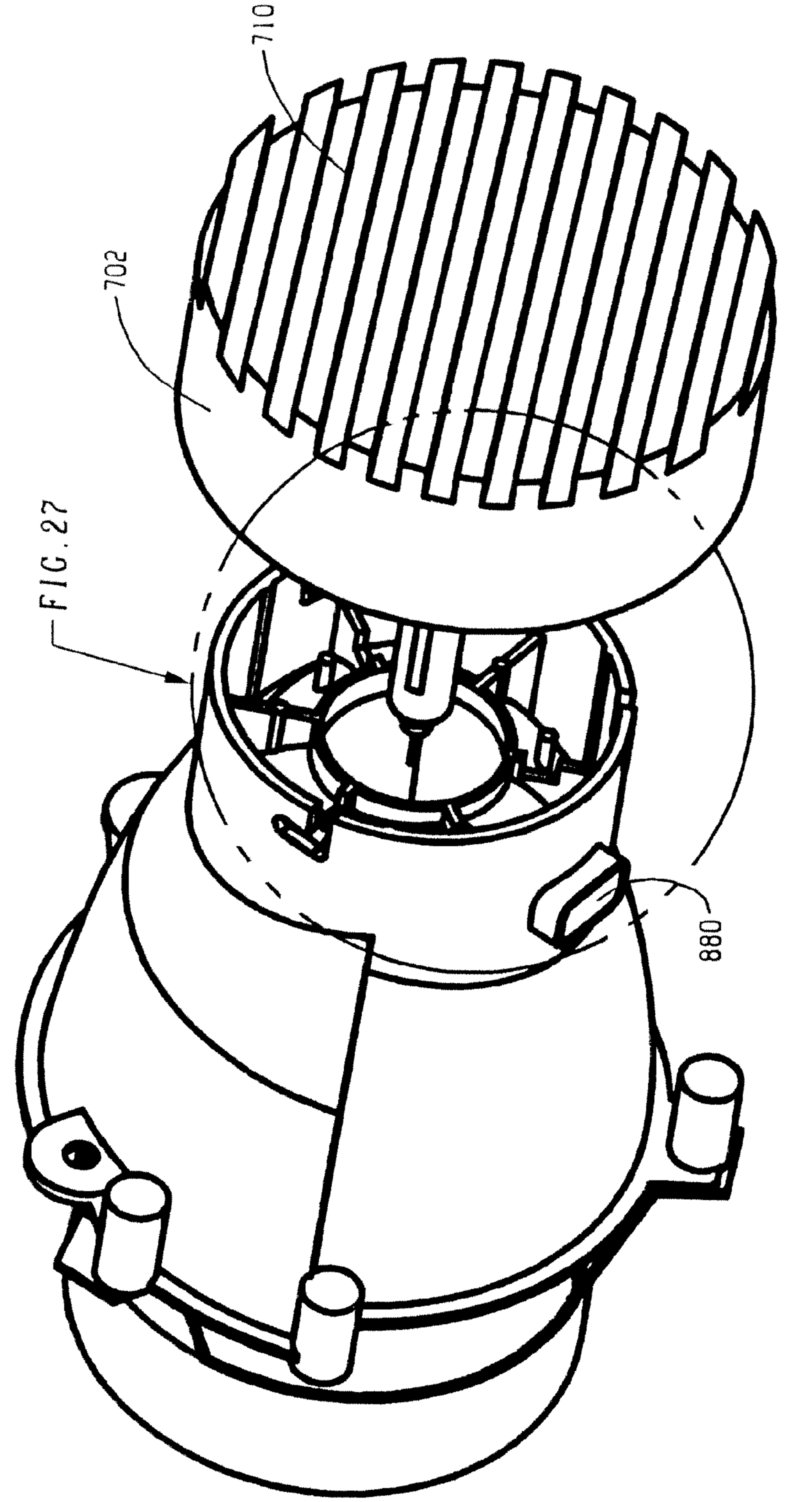
FIG. 26 is another perspective view of the disassembled fourth embodiment of an automotive discharge lamp assembly.
Figure 27:
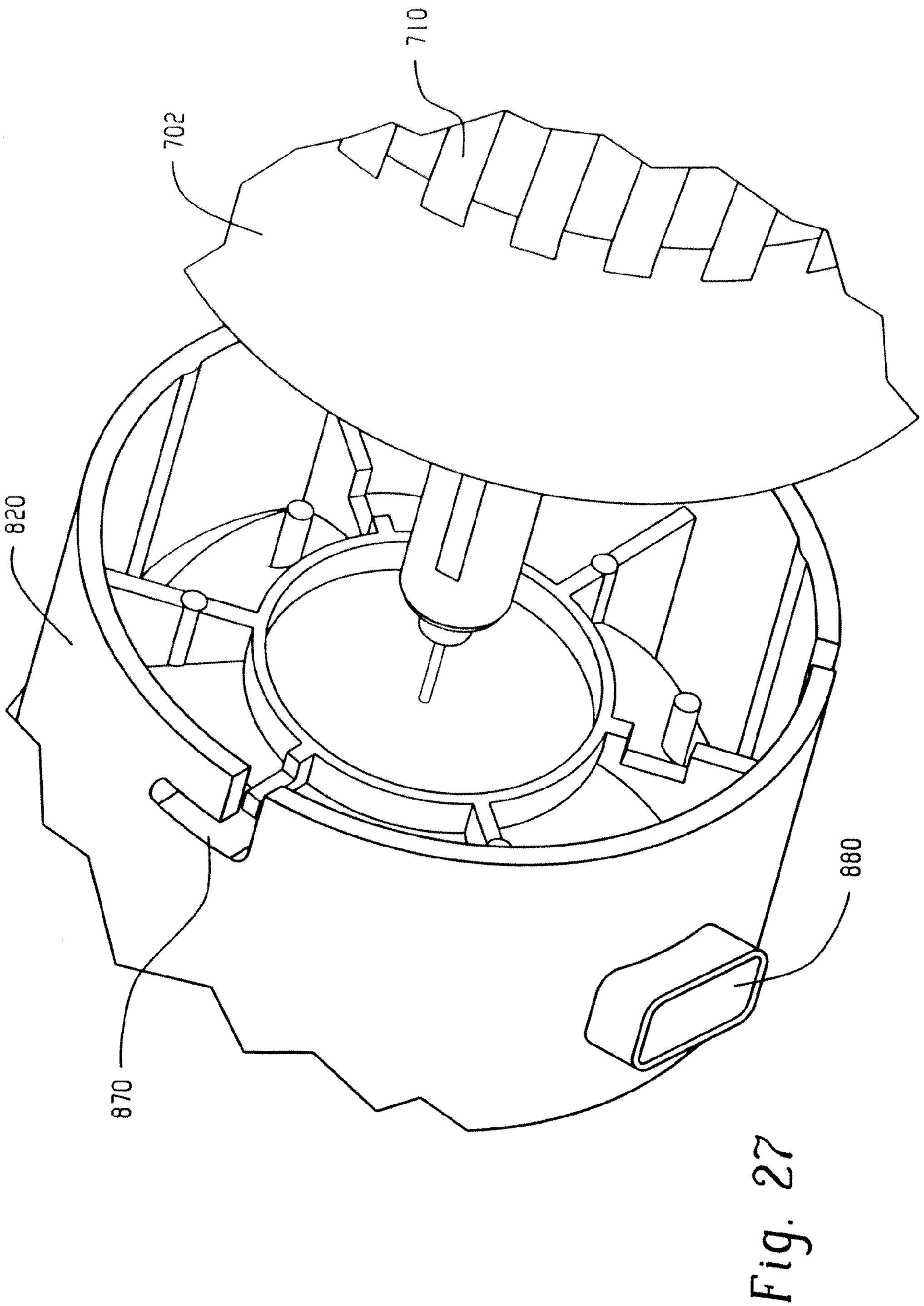
FIG. 27 is an enlarged perspective view of the encircled portion of FIG. 26.

FIGS. 9-16 are directed to and illustrate a second embodiment of an automotive discharge lamp assembly. For ease of reference and brevity of discussion, like elements in the "100" series of FIGS. 1-8 referring to the first component 100 will be referenced in the "300" series in this second embodiment (e.g., first component 300). Those elements directed to the second component 200 or headlamp optical assembly previously identified in the "200" series of FIGS. 1-8 will now be identified by reference numerals in the 400 series (e.g., second component 400). A primary area of distinction between the first embodiment of FIGS. 1-8 and the second embodiment of FIGS. 9-16 relates to the electrical connection. Specifically, electrical connector 460 is provided in the second component 400 that forms the headlamp optical assembly in this second embodiment. Consequently, in addition to a mechanical connection between the first component 300 and the second component 400, an electrical connection is also required between the first and second components. For example, the electrical connection 460 extends through the coupling wall 420, preferably between the locking ring 450 and base portion of the reflector housing 220. The electrical connector 460 is electrically connected to one or more electrical contact pins 462 (FIGS. 15-16) disposed inwardly in the coupling wall 420. The contact pins are preferably circumferentially spaced from the radial support members 432 that include at least three (3) reference surfaces 430 that form the reference plane connection with associated protrusions 334 that extend from generally planar surface 332 (FIGS. 13-14). Consequently, generally L-shaped spring-like electrical contacts 350 are provided and extend outwardly from the generally planar surface 332 for abutting, electrical contact with the individual associated pins 462 in the automotive headlamp optical assembly 400.

Again, axial advancement of the first and second components 300, 400 provides for snap-fit engagement of the snap-fit clamps into associated recesses 340, and thereafter the locking ring 450 is subsequently advanced over the threaded region on coupling surface 420 to secure or retain the snap-fit clamps in place and provide for accurate alignment and secure engagement between the fully integrated housing 302 with the automotive headlamp optical assembly 400.

A third embodiment of an automotive discharge lamp assembly C is illustrated in FIGS. 17-21. Here, the first and second components are now referenced in the "500" and "600" series, respectively (e.g. first component 500 and second component 600). Rather than using the snap-fit clamping arrangement with associated locking ring associated with the first and second embodiments of FIGS. 1-16, the third embodiment employs a bayonet-type of coupling or joining assembly. An electrical connection 560 is provided in the first component, namely the fully integrated driver assembly 500 has a high voltage starter/igniter unit and a ballast unit contained in a common housing 502, and from which a high intensity discharge lamp burner 506 extends outwardly. Again, like reference numerals will refer to like elements in an effort to minimize repetition of the description and to focus on the new features of the third embodiment. Here, the first component 500 is joined to the second component or automotive headlamp optical assembly 600 through provision of a radially extending member or pin 562 that extends outwardly from surface 522 of the housing. Preferably, multiple bayonet members or pins 562 are located at peripherally spaced locations (FIG. 19) and are dimensioned for receipt in associated L-shaped grooves 670 provided in the annular coupling surface 620.

In the bayonet-type coupling of this embodiment, there is no locking ring. Instead, the two components 500, 600 are axially advanced toward one another and circumferential orientation or alignment is achieved by insertion of the bayonet pins 562 into the associated groove 670, and particularly an axial portion 672 of the L-shaped groove. Relative axial movement of the two components toward one another advances the bayonet pin in the first portion 672 of the groove until further axial advancement is precluded by abutting engagement of pin 562 with the end of the axial portion 672 of the groove. The components 500, 600 are then rotated relative to one another so that the individual pins 562 track along a second portion 674 of the L-shaped groove. As will be appreciated, an L-shaped groove prevents inadvertent removal and disassembly of the coupled components 500, 600. Moreover, a spring such as a flat spring 676, is preferably provided at the junction of the first and second portions 672, 674 of the L-shaped groove. Additional exertion or force is required to advance the bayonet pin past the spring and into the second portion 674 of the groove. Likewise, the spring 676, or another alternative biasing arrangement, requires a predetermined force to advance the bayonet pin out of the second portion 674 of the groove for purposes of disassembly.

Although the electrical connector 560 is shown extending from a sidewall of the housing 502, the electrical connector could be located in a manner similar to that of the first embodiment of FIGS. 1-9, or at still another location on the assembly. In any event, suitable electrical connection is completed with the high voltage starter/igniter, as well as the ballast unit contained within the housing 502. Likewise, the discharge lamp 506 is held in place by clamp arms 530 and the lamp extends outwardly so that its longitudinal axis is aligned with the optical axis of reflector surface 604. Again, precise positioning and a stable secure engagement between the components 500, 600 ensures that the discharge pool of the lamp is accurately located relative to the reflective surface to maximize light emitted through the lens 610.

FIG. 22-29 illustrate a fourth embodiment, which is most closely related to the third embodiment because of the similar use of a bayonet-type coupling arrangement. Again, for purposes of consistency and brevity, like elements of the first and second components 700, 800 will be identified by like reference numerals in the "700" and "800" series (e.g. first coupling member 700 and second coupling member 800). For example, the automotive discharge lamp assembly D includes a fully integrated discharge lamp and driver assembly 700 contained within a common housing 702 and from which a high intensity discharge lamp burner 706 extends. The second component, or automotive headlamp optical assembly, 800 is mechanically and electrically joined to the first component with a bayonet-type coupling or joining assembly. Again, circumferentially spaced pins 762 extend generally radially outward from the housing 702 and are adapted for receipt in L-shaped grooves 870. Each of the grooves include first axial groove portions 872 and second axial groove portions 874 disposed in generally perpendicular relation. Spring or biasing member 876 further retains the first and second components together once make-up or assembly is complete.

A primary distinction in the fourth embodiment of FIGS. 22-29 is the location of the electrical connection 880 (FIGS. 24, 26, 27) in the coupling wall 820 of the optical assembly. This requires the generally L-shaped electrical contacts 750 that extend from the generally planar surface 732 to be adapted for engagement with the contact pins 862 within the coupling wall 820. Moreover, since there is a rotational component of movement to assembly or make-up between the first and second components 700, 800, provision must be made for the L-shaped electrical contacts 750 to "pass through" the radial support arms to allow abutting electrical contact with the pins 862. Accordingly, cutouts or recesses 882 are provided in select ones of the radial support walls so that the L-shaped contacts can extend or pass therethrough. It will be further appreciated that the L-shaped contacts are sufficiently flexible so as to be compressed and establish good electrical contact. Likewise, the contacts do not interfere with the reference plane contact between protrusions 734 extending from the first component 700 for engagement with the reference plane features 830 in the second component 800.

These new versions of discharge lamps, although having an increased lamp mass due to the fully integrated lamp, permit accurate alignment and fixation of the integrated lamp to the headlamp optical assembly. The secure fixation of the first and second components is able to withstand the high vibration load of the automotive environment, and is able to power the fully integrated lamp by proper electrical contacts built into the arrangement. A single, fully integrated lamp unit without high voltage connections, as required in traditional high intensity discharge automotive lamps, is obtained. The fully integrated lamp is a compact unit that can be handled, assembled, serviced, and replaced more easily. Full integration allows for better optimization of the burner, the driving electronics and igniter, and increases lamp reliability by avoiding detachable interfaces between these components. Electrical contact is achieved via the lamp holder/interface, and EMI noise is potentially lowered. The fully integrated lamp arrangement described above has lower power consumption compared to existing HID automotive lamp systems on the market, while keeping lamp efficacy at the same high level. This results in the system being more environmentally friendly due to its lower $CO_2$ emission, and can potentially reduce headlamp costs by up to fifty percent (50%). A minimum requirement for joining the reference surfaces is defined by at least three points, and an associated key or guide groove arrangement is provided to define the orientation or optical axis of the lamp.

The invention has been described with reference to the preferred embodiments. Obviously, modifications and alterations will occur to others upon reading and understanding the preceding detailed description. It is intended that the invention be construed as including all such modifications and alterations.

What is claimed is:

1. An automotive discharge lamp assembly comprising:

an integrated high intensity discharge lamp and driver assembly including a high voltage starter or ignitor unit and a ballast unit contained in a common housing and a high intensity discharge lamp burner extending therefrom;

an automotive headlamp optical assembly; and a joining assembly for mechanically joining the integrated high intensity discharge lamp and driver assembly with the common housing to the automotive headlamp optical assembly, the joining assembly including plural snap-fit clamps spaced at peripheral locations about one of the headlamp optical assembly and the integrated lamp and driver assembly and received in a recess in other of the headlamp optical assembly and the integrated lamp and driver assembly.

2. The automotive discharge lamp assembly of claim 1 further comprising first, second, and third protrusions extending from one of the integrated lamp and driver assembly and the headlamp optical assembly that abuttingly engage a reference surface on the other of the integrated lamp and driver assembly and headlamp optical assembly.

3. The automotive discharge lamp assembly of claim 2 further comprising a slot in one of the headlamp optical assembly and the integrated lamp and driver assembly and a key extending from the other of the headlamp optical assembly and the integrated lamp and driver assembly for rotationally orienting the optical assembly and the discharge lamp.

4. The automotive discharge lamp assembly of claim 1 further comprising a slot in one of the headlamp optical assembly and the integrated lamp and driver assembly and a key extending from the other of the headlamp optical assembly and the integrated lamp and driver assembly for rotationally orienting the optical assembly and the discharge lamp.

5. The automotive discharge lamp assembly of claim 1 further comprising a threaded ring received on one of the headlamp optical assembly and the integrated lamp and driver assembly that operatively engage thread portions on the other of the headlamp optical assembly and the integrated lamp and driver assembly.

6. The discharge lamp assembly of claim 5 wherein the threaded ring is received over the snap-fit clamps.

7. The discharge lamp assembly of claim 1 further comprising an electrical contact in the headlamp optical assembly that cooperates with an electrical contact in the integrated lamp and driver assembly.

8. An automotive discharge lamp assembly comprising:

an integrated high intensity discharge lamp and driver assembly including a high voltage starter or ignitor unit and a ballast unit contained in a common housing and a high intensity discharge lamp burner extending therefrom; and a headlamp optical assembly; and a joining assembly for mechanically joining the integrated high intensity discharge lamp and driver assembly with the common housing to the automotive headlamp optical assembly, the joining assembly including at least one bayonet pin extending outwardly from one of the integrated lamp and driver common housing and the headlamp optical assembly for operative receipt in a groove formed in other of the integrated lamp and driver common housing and headlamp optical assembly, and a spring operatively engaging the bayonet pin to prevent inadvertent removal from the groove.

9. The automotive discharge lamp assembly of claim 8 further comprising first, second and third protrusions extending from one of the integrated lamp and driver assembly and the headlamp optical assembly that abuttingly engage a reference surface on the other of the integrated lamp and driver assembly and headlamp optical assembly.

10. The automotive discharge lamp assembly of claim 8 wherein each groove has a generally L-shape, an axial first portion of the L-shape for permitting relative axial advancement of the integrated high intensity discharge lamp and driver assembly with the common housing toward the headlamp optical assembly.

11. The discharge lamp assembly of claim 10 wherein each generally L-shape groove includes a generally circumferential second portion for permitting rotational movement of the integrated high intensity discharge lamp and driver assembly with the common housing relative to the headlamp optical assembly.

12. The automotive discharge assembly of claim 11 wherein each generally circumferential second portion of the generally L-shape groove forms an included angle equal or less than ninety (90) degrees with the axial first portion of the groove.

13. The automotive discharge lamp assembly of claim 12 wherein the spring urges the bayonet pin into the generally circumferential second portion of the generally L-shape groove.

14. The automotive discharge lamp assembly of claim 8 wherein each groove has a generally L-shape that includes an axial first portion and a generally circumferential second portion forming an included angle of equal or less than ninety (90) degrees, and the spring retains the bayonet pin in the circumferential second portion.

15. The discharge lamp assembly of claim 8 further comprising electrical contacts in the headlamp optical assembly that cooperate with electrical contacts in the integrated high intensity discharge lamp and driver assembly.

* * * * *